(12) United States Patent
Allen

(10) Patent No.: US 10,030,680 B2
(45) Date of Patent: Jul. 24, 2018

(54) PANEL MOUNT SYSTEM

(71) Applicant: GLASS VICE HOLDINGS LIMITED, Auckland (NZ)

(72) Inventor: Warwick James Allen, Auckland (NZ)

(73) Assignee: GLASS VICE HOLDINGS LIMITED, Auckland (NZ)

( * ) Notice: Subject to any disclaimer, the term of this patent is extended or adjusted under 35 U.S.C. 154(b) by 435 days.

(21) Appl. No.: 14/355,556

(22) PCT Filed: Oct. 31, 2012

(86) PCT No.: PCT/IB2012/056034
§ 371 (c)(1),
(2) Date: Apr. 30, 2014

(87) PCT Pub. No.: WO2013/064985
PCT Pub. Date: May 10, 2013

(65) Prior Publication Data
US 2014/0334874 A1    Nov. 13, 2014

(30) Foreign Application Priority Data

Oct. 31, 2011 (NZ) .......................... 596115
Jan. 24, 2012 (NZ) .......................... 597778
May 3, 2012 (NZ) .......................... 599765

(51) Int. Cl.
*F16B 2/12* (2006.01)
*E04C 1/42* (2006.01)
(Continued)

(52) U.S. Cl.
CPC .................. *F16B 2/12* (2013.01); *E04C 1/42* (2013.01); *E04F 11/1812* (2013.01);
(Continued)

(58) Field of Classification Search
CPC ............... E04F 11/1812; E04F 11/1817; E04F 11/1834; E04F 11/1851; E04F 11/1853;
(Continued)

(56) References Cited

U.S. PATENT DOCUMENTS 3,274,744 A * 9/1966 Blum .................. E04F 11/1812
256/65.16
3,630,490 A  12/1971 Horgan
(Continued)

FOREIGN PATENT DOCUMENTS

DE  102009008307  * 10/2009 .......... E04F 11/1851
EP    1700990 A1  * 9/2006 .......... E04F 11/1851
(Continued)

OTHER PUBLICATIONS

Machine translation of Foreign reference EP 1700990, obtained from https://patentscope.wipo.int/search/en/detail.jsf?docId=EP14610339&recNum=1&maxRec=&office=&prevFilter=&sortOption=&queryString=&tab=PCTDescription (last accessed on Aug. 1, 2016).*

(Continued)

*Primary Examiner* — Theodore V Adamos
(74) *Attorney, Agent, or Firm* — Morrison & Foerster LLP

(57) ABSTRACT

A panel mount for non penetrative fastening of a panel (such as a glass pane) able to be mounted to a structure, and preferably to a vertical or side surface of that structure, which provides a pair of clamp jaws defining an elongate slot in which an edge of a panel can be received and an intermediate clamping member associated with each jaw, each intermediate clamping member having at least one threaded member associated therewith to facilitate adjust- (Continued)

ment of the position and orientation of the intermediate member within the clamp jaw so as to securely retain the panel within the slot.

13 Claims, 15 Drawing Sheets

(51) Int. Cl.
*E04F 11/18* (2006.01)
*E04H 4/06* (2006.01)
*E04H 17/16* (2006.01)

(52) U.S. Cl.
CPC ............ *E04F 11/1853* (2013.01); *E04H 4/06* (2013.01); *E04H 17/16* (2013.01); *Y10T 403/7067* (2015.01)

(58) Field of Classification Search
CPC ....... F16B 2/12; F16M 13/022; E06B 3/5454; E06B 2003/5472; A47K 3/001; A47K 3/14; E04C 1/42; E04H 17/16; E04H 4/06; Y10T 403/7067
USPC ......... 52/126.3, 126.4, 126.7, 204.65, 238.1, 52/766, 800.12, 800.14, 800.16, 832; 403/374.3
See application file for complete search history.

(56) References Cited

U.S. PATENT DOCUMENTS

| | | | | | |
|---|---|---|---|---|---|
| 4,054,268 | A | * | 10/1977 | Sher | ............. E04F 11/1851 256/24 |
| 4,220,420 | A | * | 9/1980 | Aston | ............. E02B 7/54 251/147 |
| 4,680,903 | A | | 7/1987 | Horgan, Jr. | |
| 4,819,781 | A | * | 4/1989 | Saito | ............. B66B 23/22 198/335 |
| 4,837,993 | A | * | 6/1989 | Studenski | ............. E06B 3/02 52/208 |
| 5,307,919 | A | * | 5/1994 | Wente | ............. B66B 23/22 198/335 |
| 6,434,905 | B1 | | 8/2002 | Sprague | |
| 8,240,111 | B2 | * | 8/2012 | Feigl | ............. E04F 11/1851 52/184 |
| 2002/0100234 | A1 | * | 8/2002 | Sprague | ............. E06B 3/02 52/208 |
| 2008/0236095 | A1 | * | 10/2008 | Kim | ............. E06B 3/5454 52/784.16 |
| 2009/0031653 | A1 | * | 2/2009 | Nash | ............. E06B 3/5454 52/238.1 |
| 2010/0225040 | A1 | * | 9/2010 | Allen | ............. E04F 11/1851 269/297 |
| 2010/0307082 | A1 | | 12/2010 | Nash | |

FOREIGN PATENT DOCUMENTS

| | | | |
|---|---|---|---|
| EP | 2017399 B1 | 1/2009 | |
| JP | 2007-032085 A | 2/2007 | |
| NZ | 551096 | 11/2006 | |
| WO | WO-2009/005376 A1 | 1/2009 | |
| WO | WO 2009003431 A1 * | 1/2009 | ............ E04F 11/181 |
| WO | WO-2010/091519 A1 | 8/2010 | |
| WO | WO 2011095779 A2 * | 8/2011 | .......... E04F 11/1851 |

OTHER PUBLICATIONS

Machine translation of Foreign reference DE 10 2009 008307 A1, obtained from https://patentscope.wipo.int/search/en/detail.jsf?docId=DE104892262&redirectedID=true (last accessed on Aug. 1, 2016).*
Machine translation of Foreign reference WO 2009003431, obtained from https://patentscope.wipo.int/search/en/detail.jsf?docId=WO2009003431&recNum=1&maxRec=&office=&prevFilter=&sortOption=&queryString=&tab=PCTDescription (last accessed on Aug. 2, 2016).*
International Search Report received for PCT Patent Application No. PCT/IB2012/056034, dated Jan. 8, 2013, 5 pages.
Written Opinion received for PCT Patent Application No. PCT/IB2012/056034, dated Jan. 8, 2013, 11 pages.
International Preliminary Report on Patentability received for PCT Application No. PCT/IB2012/056034, dated May 15, 2014, 13 pages.

* cited by examiner

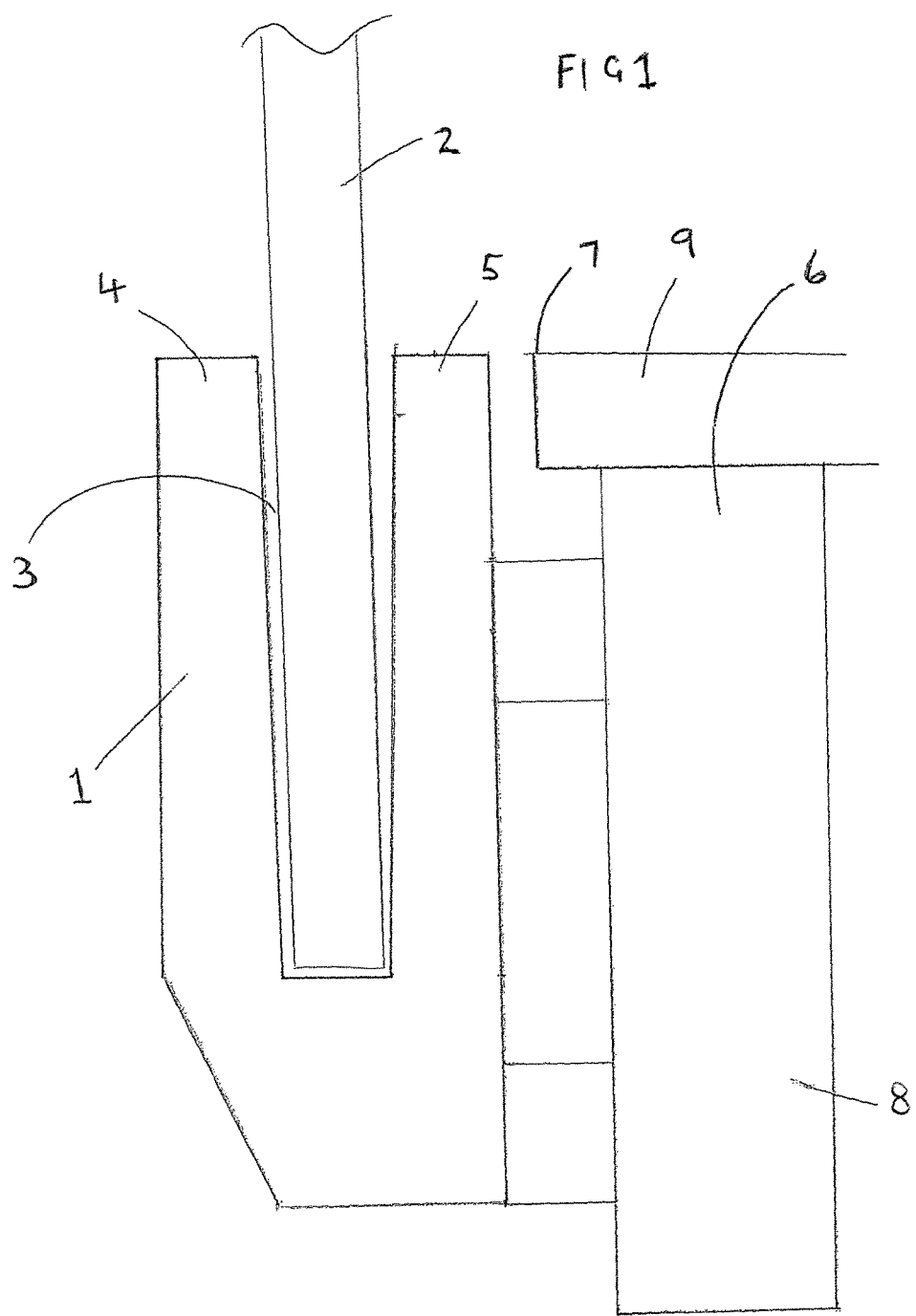

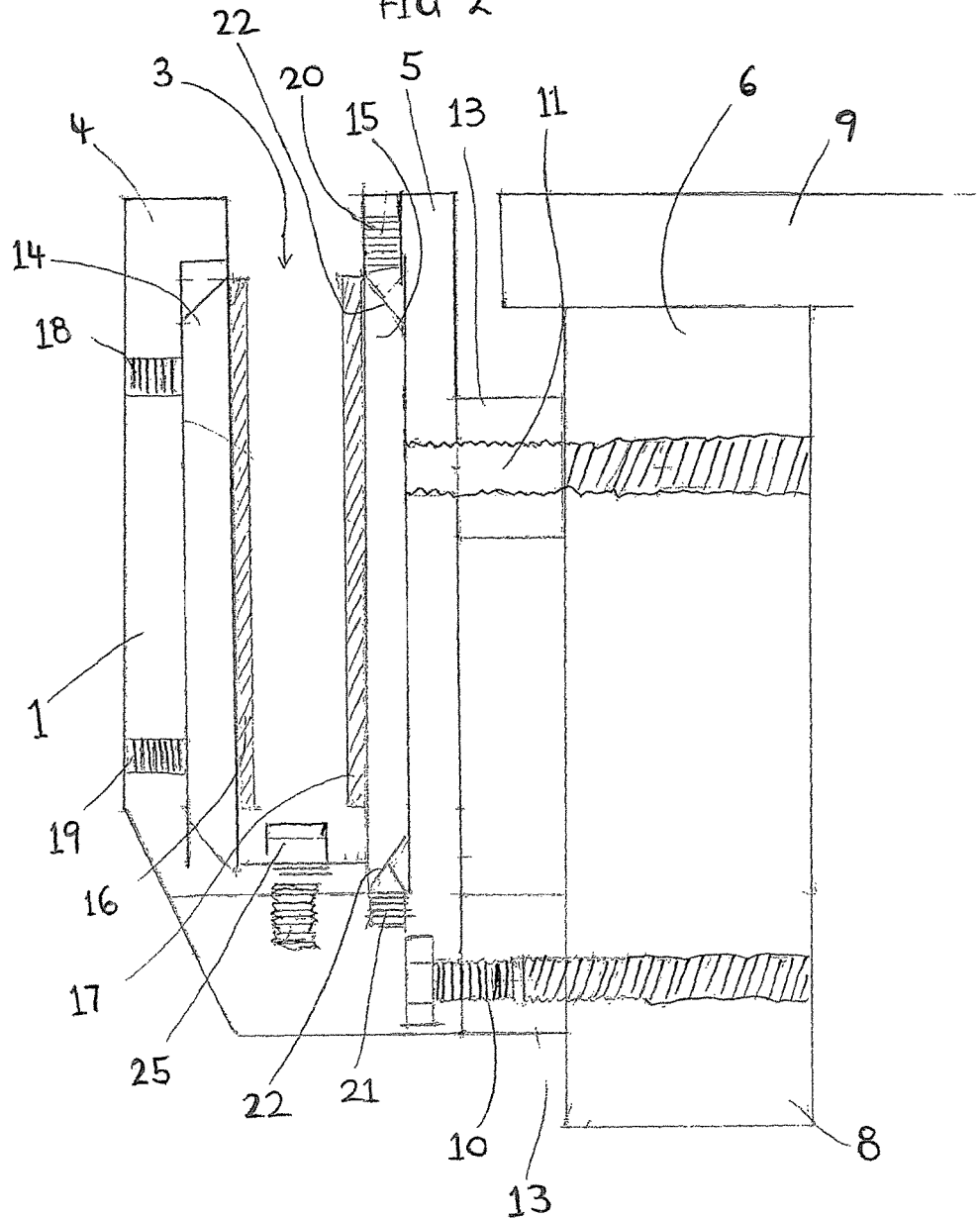

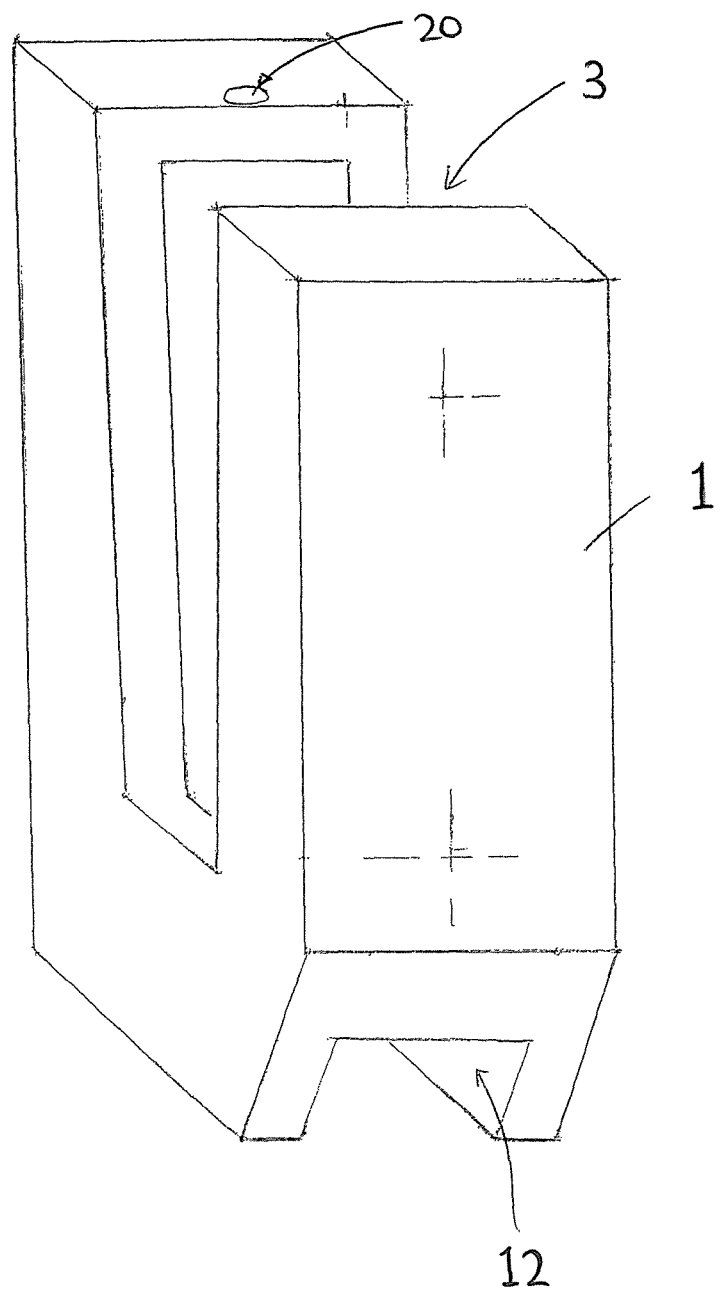

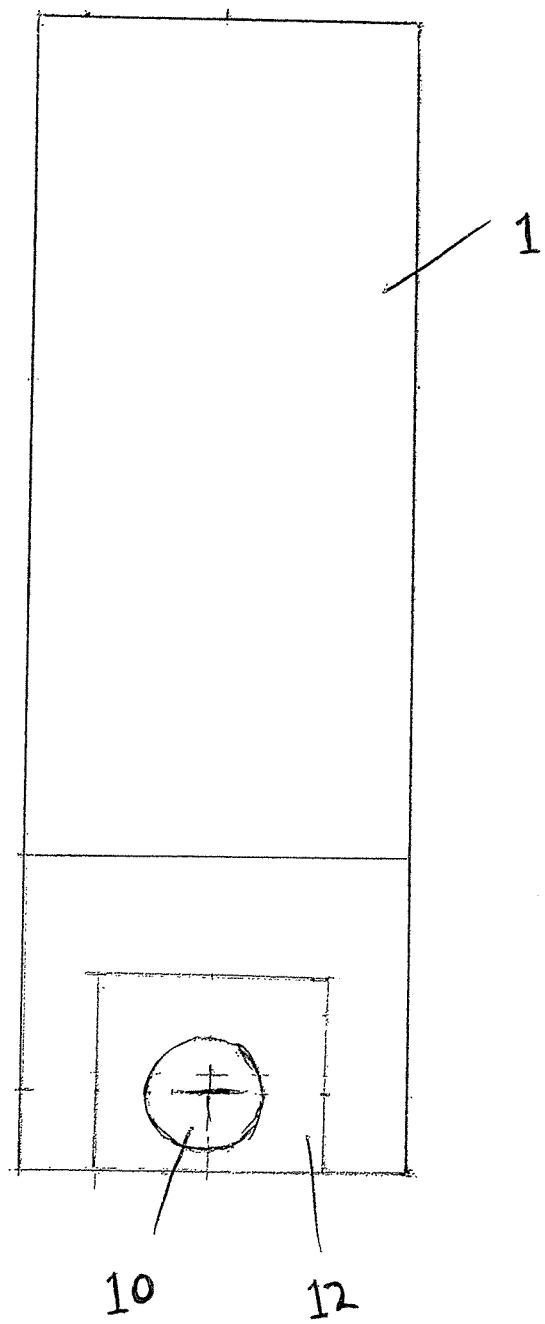

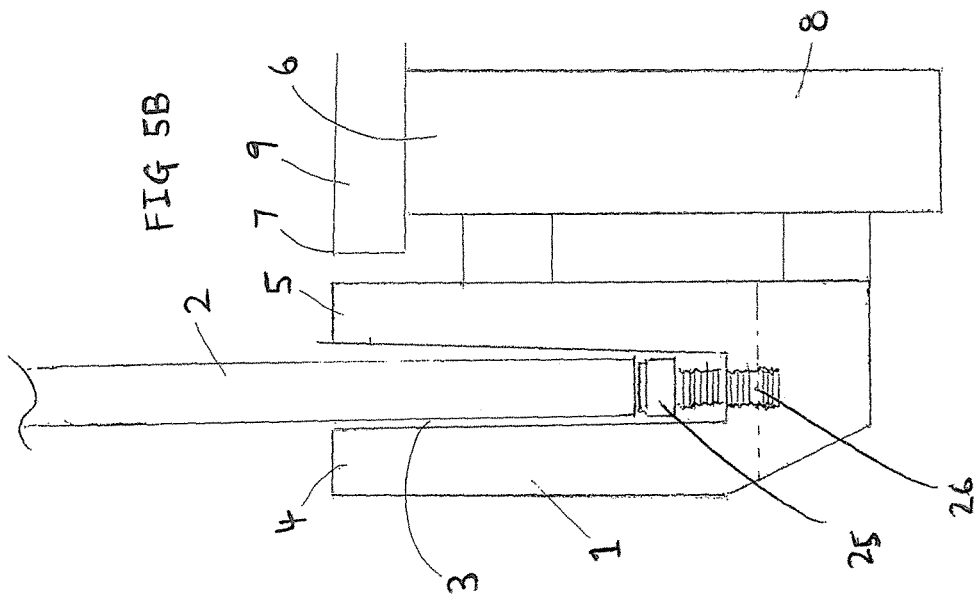
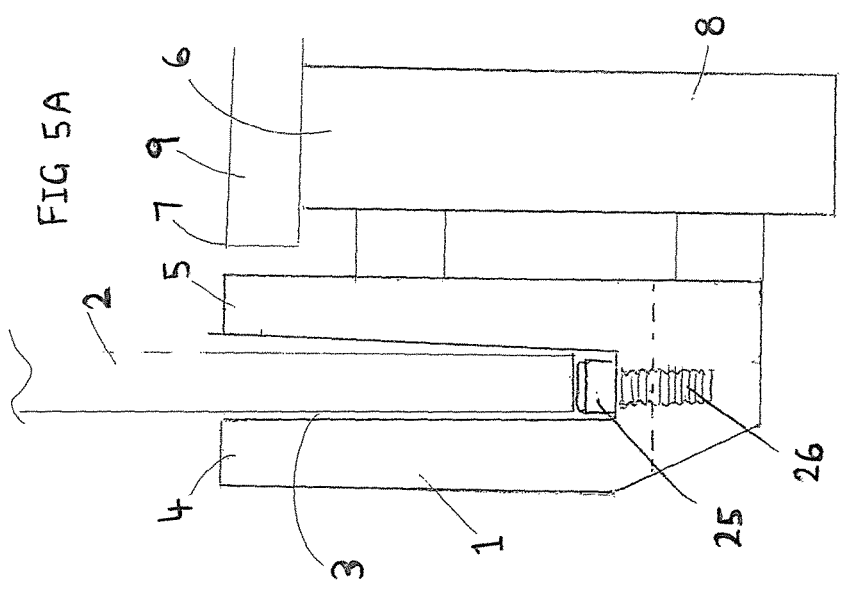

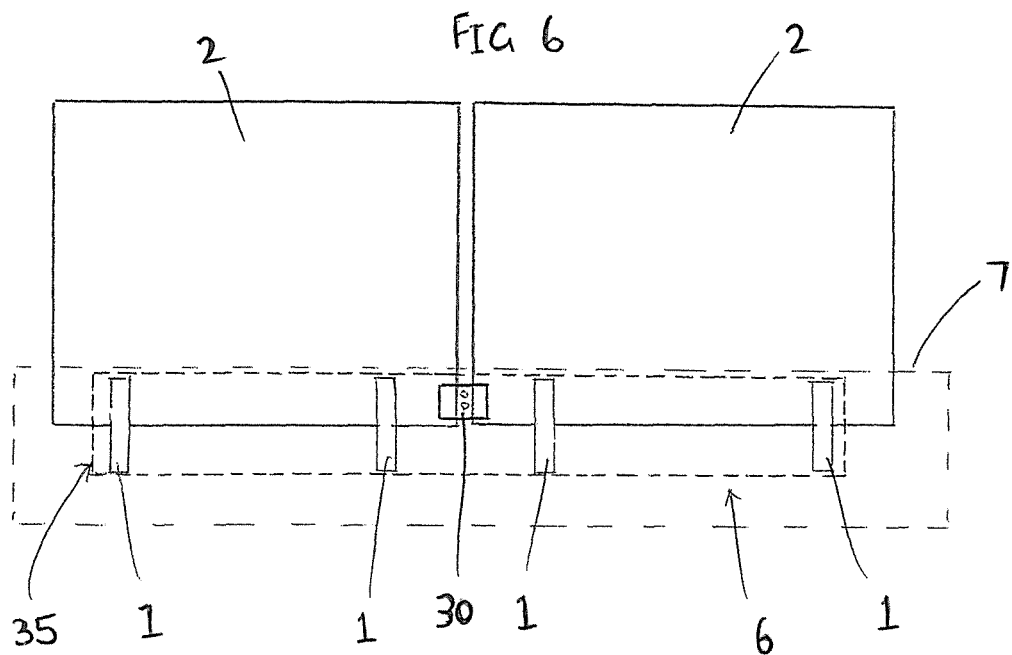
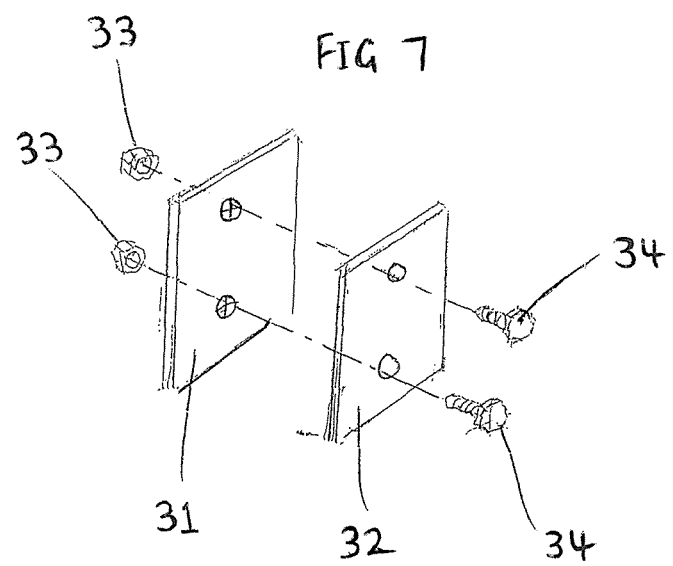

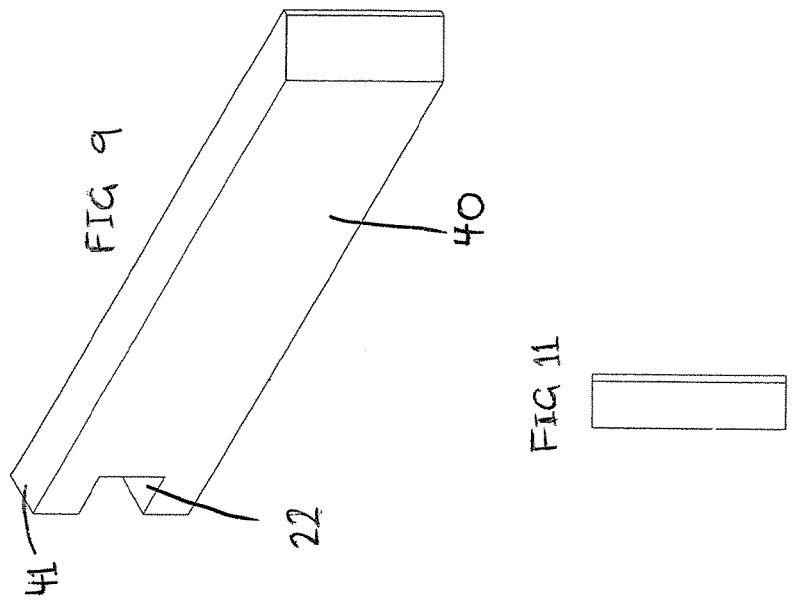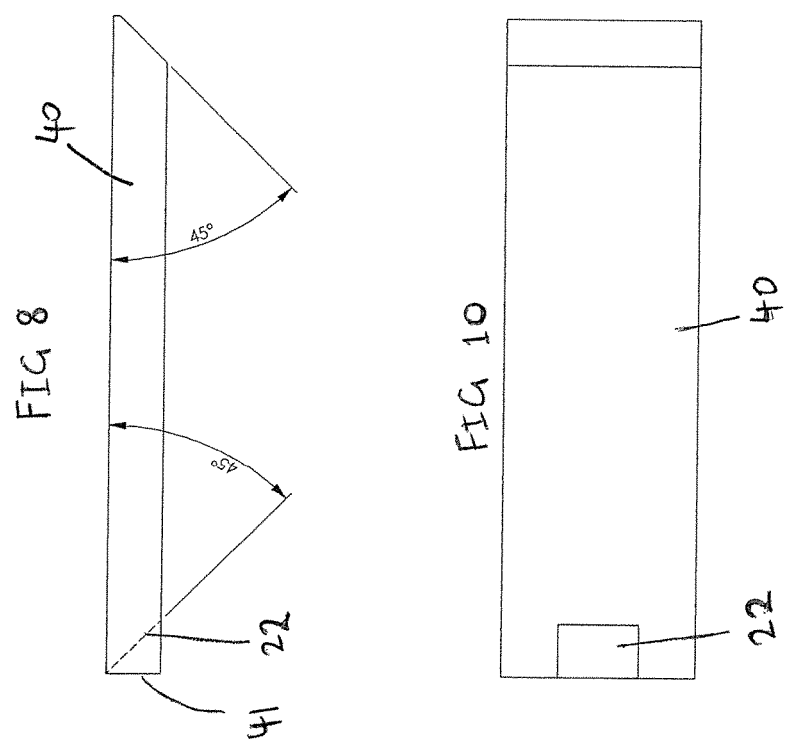

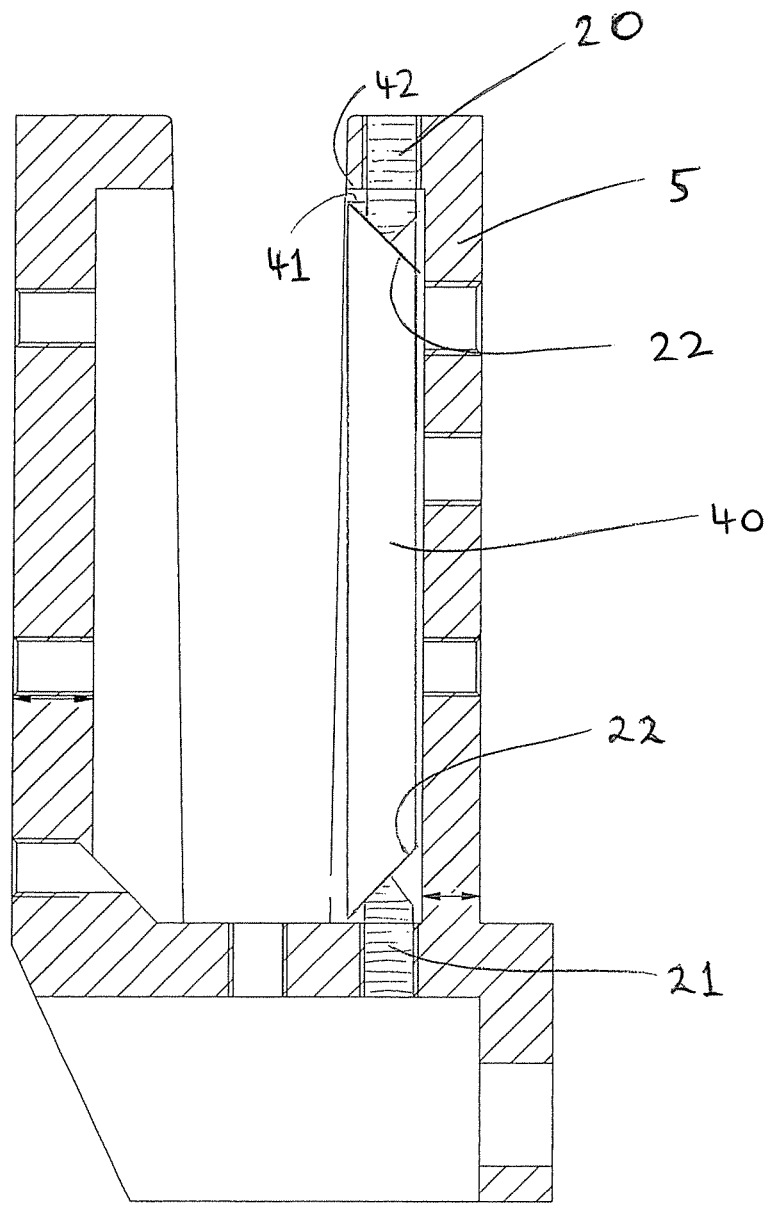

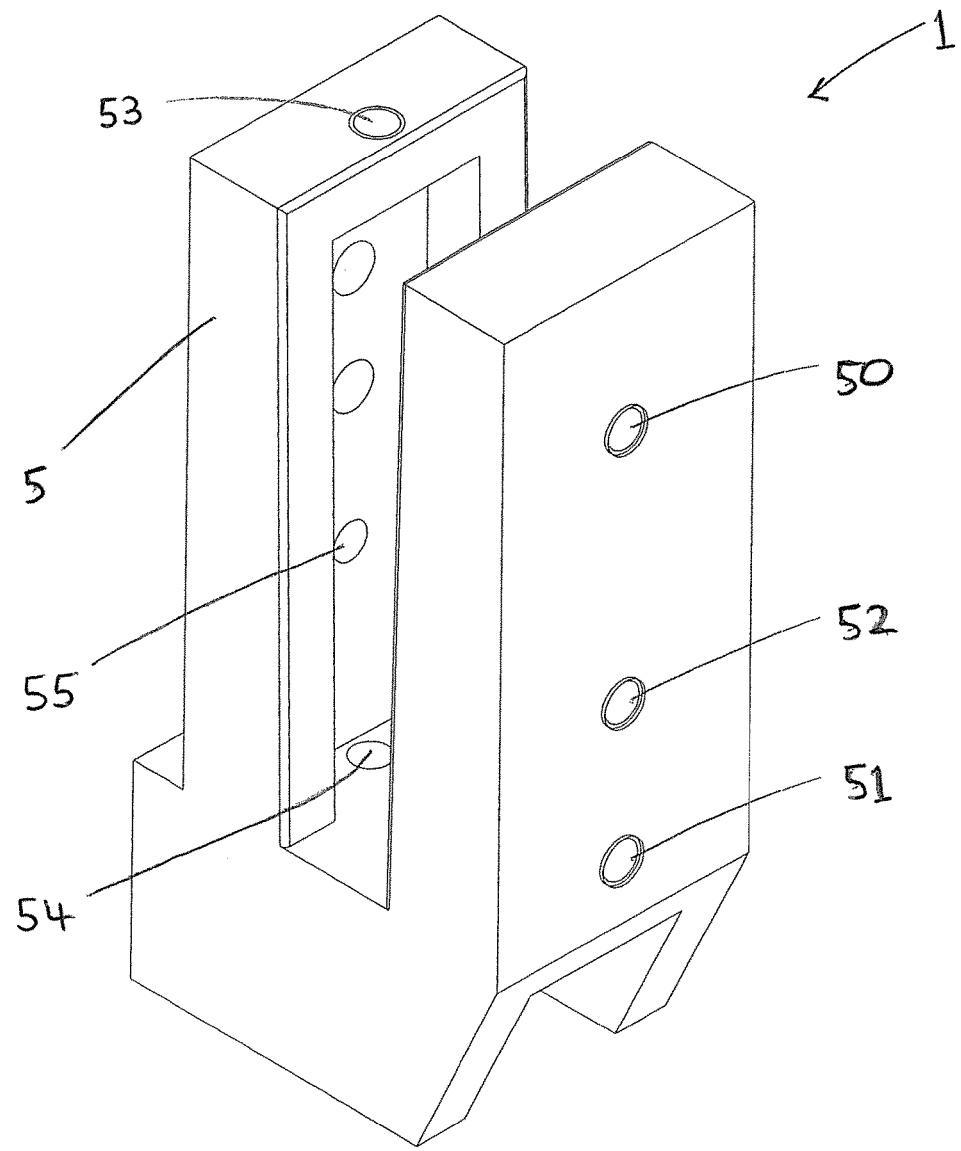

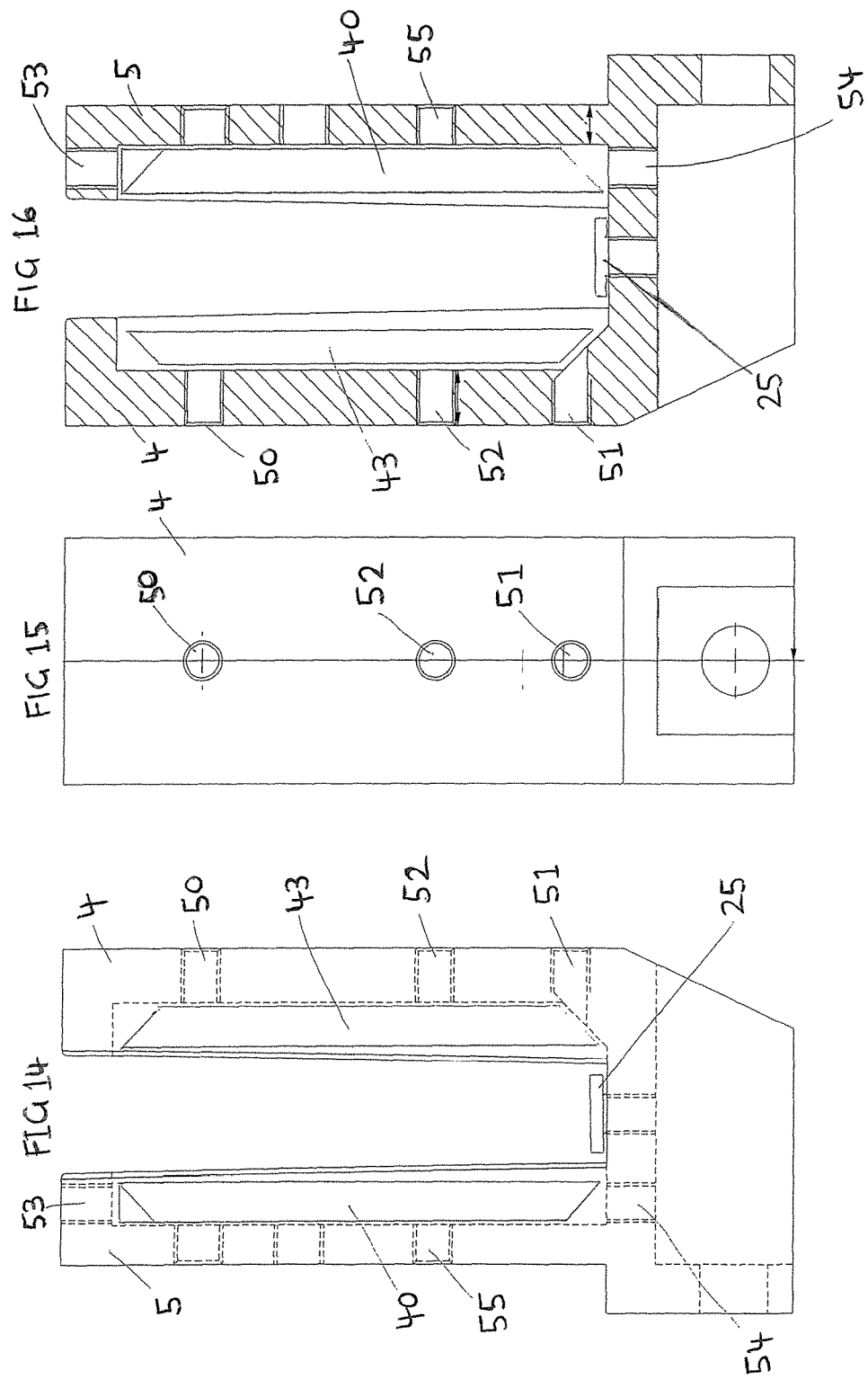

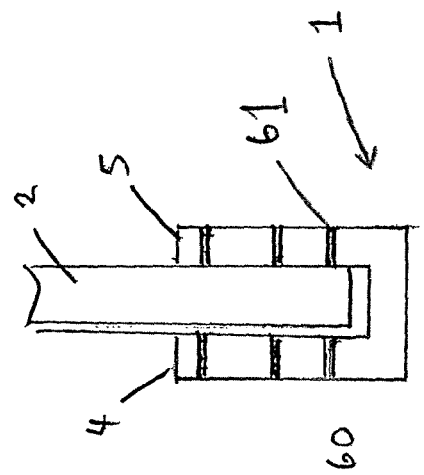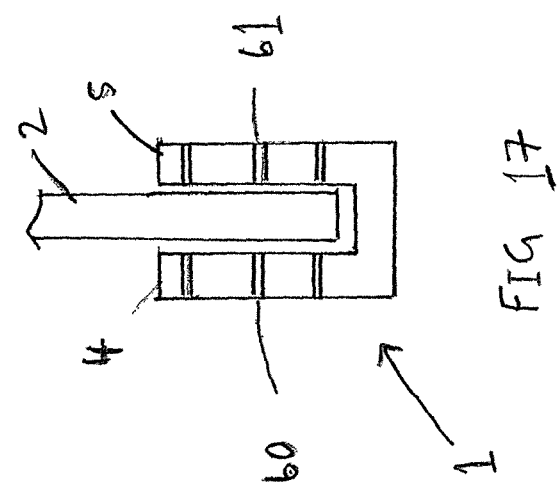

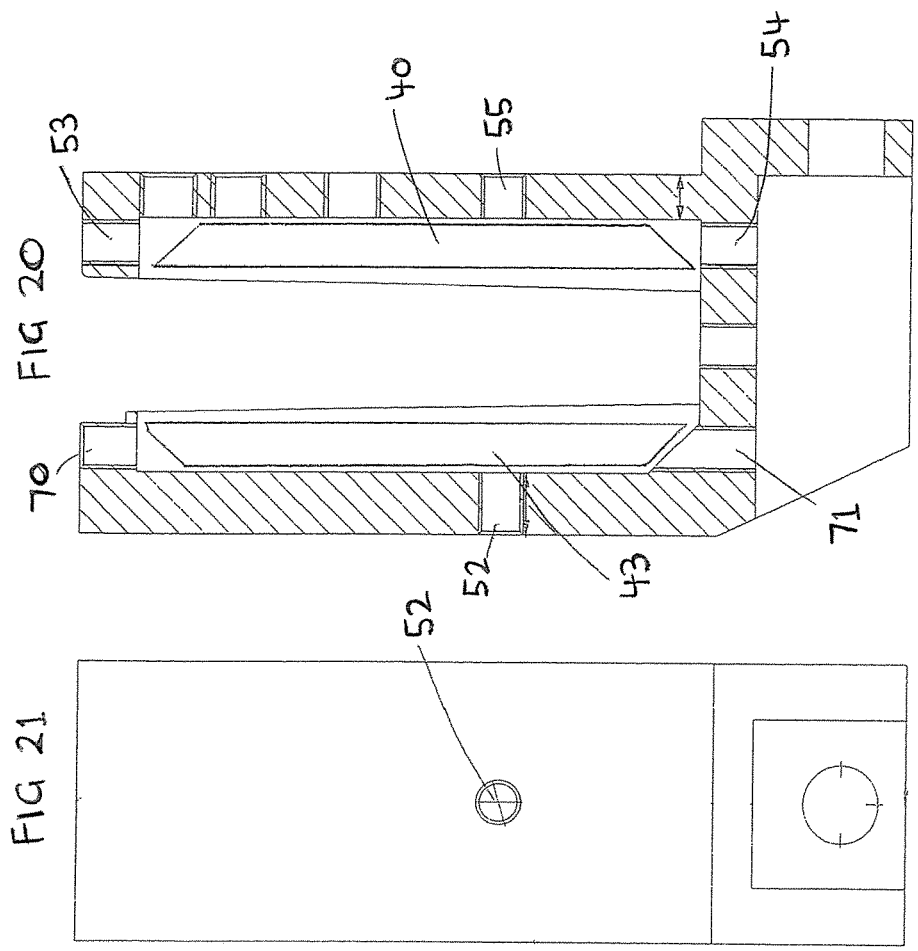
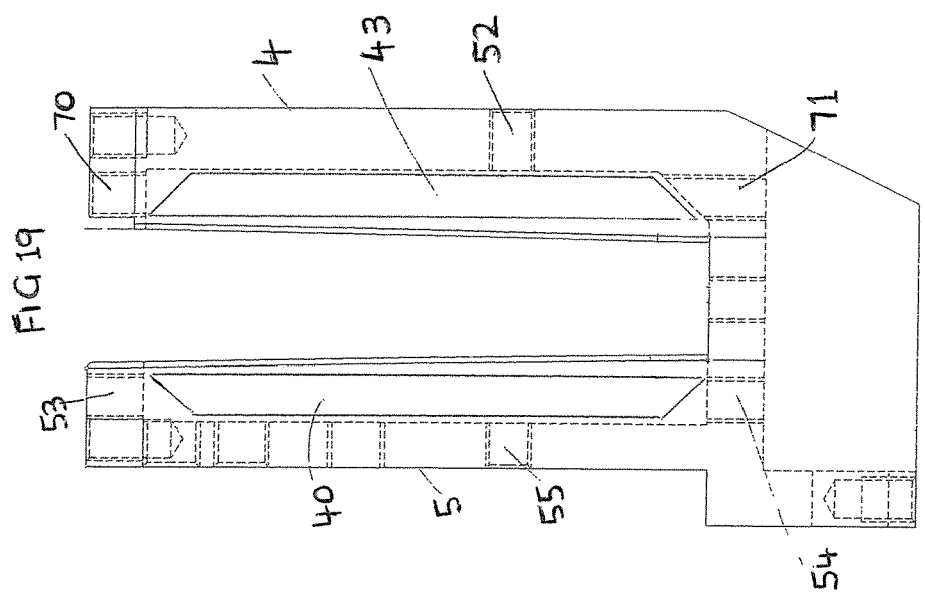

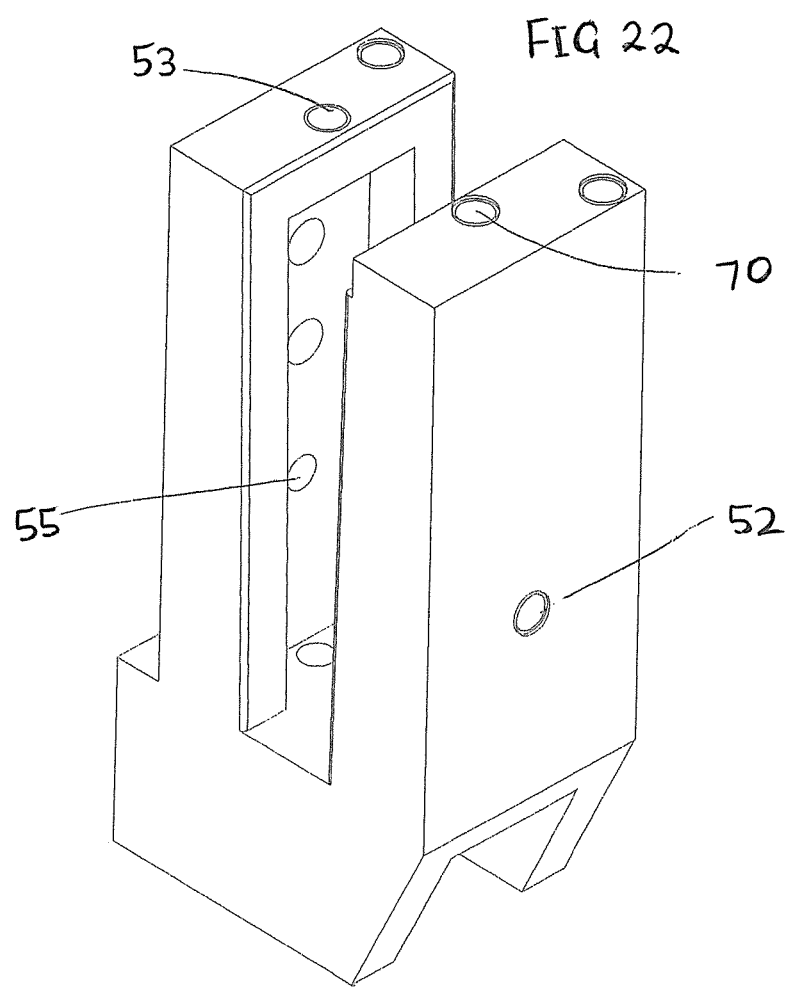

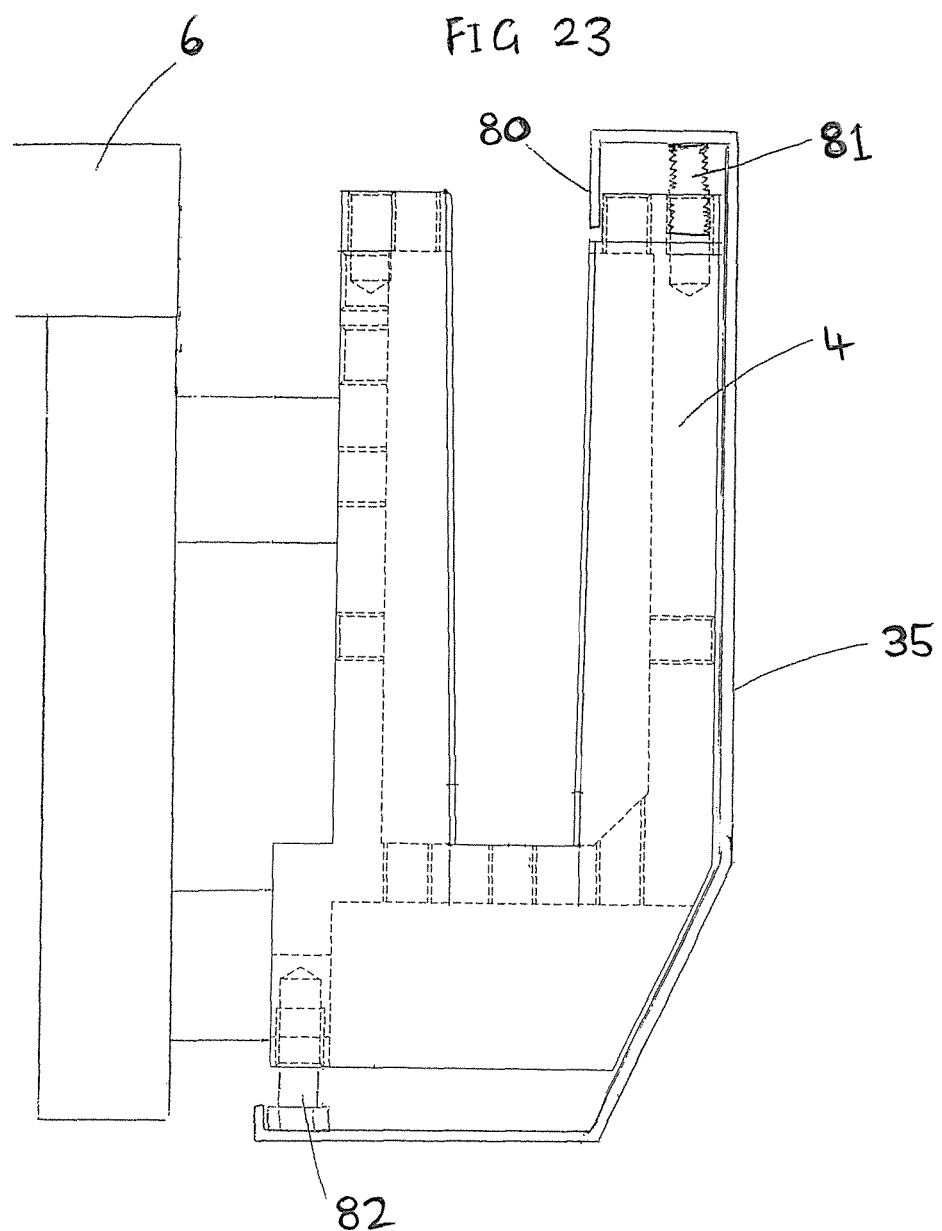

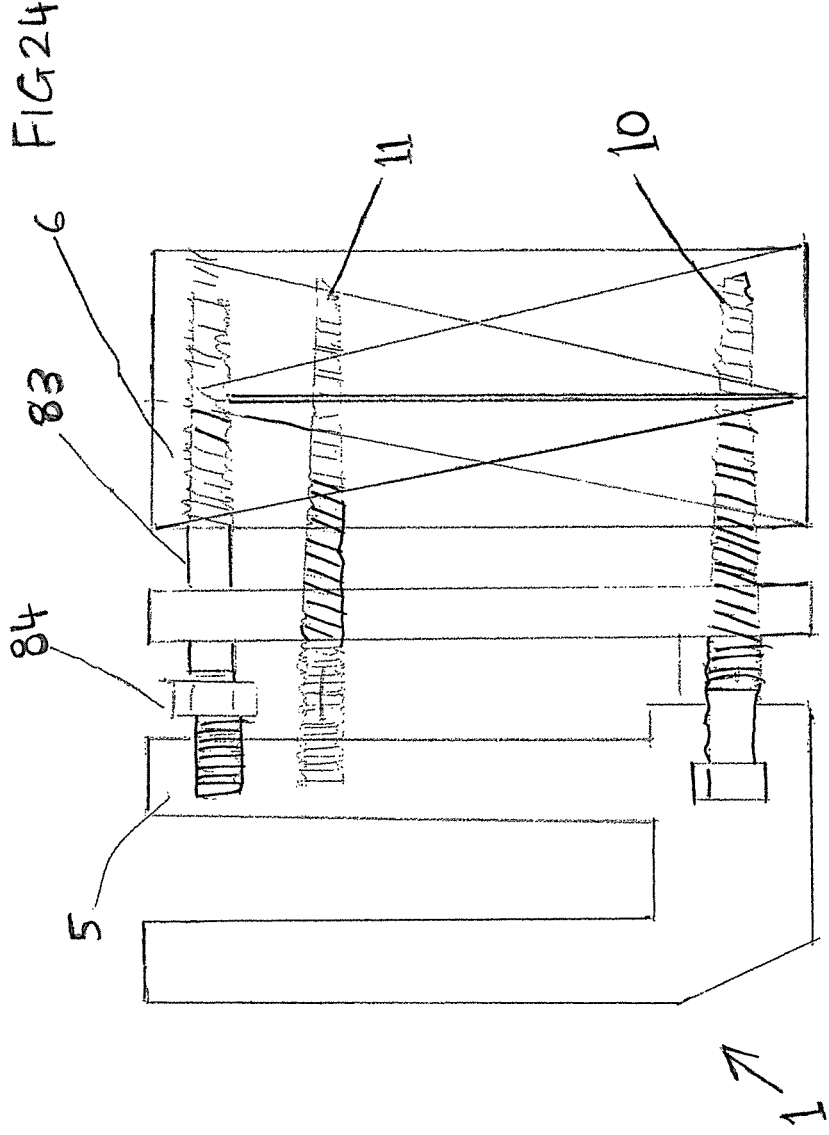

PANEL MOUNT SYSTEM

CROSS REFERENCE TO RELATED APPLICATIONS

This is a U.S. National Phase patent application of International Application No. PCT/IB2012/056034, filed Oct. 31, 2012, which claims priority to New Zealand Patent Application No. 596115 filed on Oct. 31, 2011, New Zealand Patent Application No. 597778 filed on Jan. 24, 2012, and New Zealand Patent Application No. 599765 filed on May 3, 2012, each of which is hereby incorporated by reference in the present disclosure in its entirety.

FIELD OF THE INVENTION

The present invention relates to panel mounts for the mounting of panels such as glass panes.

BACKGROUND

Glass panes are used in buildings for many purposes. Glass panes can offer partitions within offices, showers, as a guard rail around an edge with a drop off, as fencing for a pool and the like.

Such glass panes are normally of a reinforced glass that has substantial impact or break resistance. Post production workability of such glass can be difficult.

Mounting of such glass panes can be cumbersome. The glass panes are heavy. They are inflexible. They can be difficult and time consuming to drill.

WO2009/005376 illustrates a device for supporting a glass pane without the need for drilling holes in the glass. One or more of the devices can be provided to support one or more glass panes to create partitions, guard rails, fencing or the like. While these devices provide adequate support to glass panes and are adjustable to some degree, they do have some limitations. They are designed to be mounted such that they extend above the surface to which they are mounted. For this reason, these devices can obscure the view through the glass somewhat, and may be considered unsightly. In some applications the glass pane may acts as a guard rail around an edge with a drop off. Some consumers may prefer an uninterrupted view through the glass pane so that they can enjoy the view through the glass to the fullest extent.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

Accordingly it is an object of present invention to provide a panel mount to provide improvements to known means for mounting a panel and/or that will at least provide the public with a useful choice.

It is a further or alternative object of the present invention to provide an improved partition arrangement or system that will at least provide the public with a useful choice.

BRIEF DESCRIPTION OF THE INVENTION

In one aspect the present invention may be broadly said to consist in a panel mount for non penetrative fastening of a panel, said panel mount comprising:

at least one fastener for mounting the panel mount to a side of a structure such that at least a portion of said panel, once fastened, extends above a top surface of said structure, a pair of clamp jaws having substantially opposed and parallel inner faces and defining an elongate slot in which an edge of a panel can be received, the elongate slot having an elongate direction, two intermediate clamping members, one located adjacent each clamp jaw and to be positioned between each clamp jaw and the panel such that a panel can be clamped between the intermediate clamping members to secure the panel at the slot, each intermediate clamping member having at least one threaded member associated therewith, the at least one threaded members each facilitating movement of the intermediate clamping member to which the at least one threaded member is associated relative to each intermediate clamping member's adjacent clamp jaw, and independently of the other intermediate clamping member, wherein the slot has a general plane which extends along the elongate direction of the slot and is substantially parallel to the inner faces of the jaws, and at least one of the intermediate clamping members is adjustable by movement of at least one of said threaded members in a direction non-perpendicular to the general plane of the slot.

In some embodiments at least one of the intermediate clamping members is moveable so as to be positioned by movement of at least one of said threaded members in a direction purely parallel to the general plane of the slot.

In some embodiments said at least one threaded member that moves in a direction non-perpendicular to the general plane of the slot is oriented such that during movement the elongate axis of the at least one threaded member is in a direction non-perpendicular to the general plane of the slot.

In some embodiments said at least one threaded member moveable in a direction non-perpendicular to the general plane of the slot can be adjusted either from above or below the panel mount.

In some embodiments both intermediate clamping members are moveable so as to be positioned by movement of at least one threaded member in a direction non-perpendicular to the general plane of the slot.

In some embodiments one of the intermediate clamping members is moveable so as to be positioned by movement of at least one threaded member in a direction non-perpendicular to the general plane of the slot, the other intermediate clamping member being moveable so as to be positioned by at least one threaded member orientated substantially normal to the general plane of the slot.

In some embodiments two threaded members are associated with one of, or each of, the intermediate clamping members.

In some embodiments each intermediate clamping member has two ends, and wherein the position of each end of at least one intermediate clamping member is individually controllable relative to the general plane of the slot.

In some embodiments one of the intermediate clamping members is moveable so as to be positioned in a direction perpendicular to the general plane of the slot by movement of at least one threaded member oriented in a direction substantially normal to the general plane of the slot, and wherein said intermediate clamping member has two ends, each end being independently moveable relative to said intermediate clamping member's respective clamp jaw by the movement of at least one threaded member oriented in a direction substantially parallel to the general plane of the slot.

In some embodiments each intermediate clamping member has two ends, and wherein said at least one threaded member(s) cooperate with a respective intermediate clamping member to establish a wedging effect to cause movement of a respective intermediate clamping member.

In some embodiments the wedging effect can allow for either displacement, rotation, or displacement and rotation, of the respective intermediate clamping member.

In some embodiments the wedging effect is established at one end of the respective intermediate clamping member.

In some embodiments the wedging effect is established at both ends of the respective intermediate clamping member.

In some embodiments at least one of said at least one threaded members bear either directly or indirectly on an angled surface of a respective intermediate clamping member to adjust said intermediate clamping member's either displacement, rotational, or displacement and rotational, position.

In some embodiments the at least one threaded members each have a tip, the tips each being angled to be complementary with angled surfaces of the intermediate clamping member.

In some embodiments said at least one fastener is oriented in a direction substantially normal to the general plane of the slot.

In some embodiments spacing members are to be positioned between the side of the structure and the panel mount, when mounted, to position the panel mount at a distance away from the side of the structure.

In some embodiments the slot is wider than the thickness of the panel.

In some embodiments the panel mount can operatively clamp said panel to hold the panel in said slot irrespective of any non-parallel disposition of the panel to the general plane of said slot.

In some embodiments a primary threaded member of each intermediate clamping member facilitates a lateral movement of its respective intermediate clamping member relative its respective clamp jaw, the primary threaded members configured to, upon the lateral movement of at least one of the intermediate clamping members to clamp a panel between the intermediate clamping members, form a pivot for the panel relative to the clamp jaws, and wherein the panel mount further comprises two secondary threaded members, either of one secondary threaded member in association with each intermediate clamping member or both secondary threaded members in association with a single intermediate clamping member, the secondary threaded members configured to facilitate the adjustment of the orientation of the intermediate clamping members and a clamped panel about its primary threaded member formed pivot, the two secondary threaded members each being moveable in a direction non-perpendicular to the general plane of the slot.

In yet a further aspect the present invention may be broadly said to consist in a panel mount for non penetrative fastening of a panel, said panel mount comprising:

at least one fastener for mounting the panel mount to a side of a structure such that at least a portion of said panel, once fastened, extends above a top surface of said structure, a pair of clamp jaws defining an elongate slot in which an edge of a panel can be received, two intermediate clamping members, one located adjacent each clamp jaw and to be positioned between each clamp jaw and the panel such that a panel can be clamped between the intermediate clamping members to secure the panel at the slot, each intermediate clamping member having at least one threaded member associated therewith, the at least one threaded members facilitating positioning and repositioning of the intermediate clamping member to which the at least one threaded member is associated relative to each intermediate clamping member's adjacent clamping jaw, and independently of the other intermediate clamping member, wherein at least one of said threaded members is presented at an upwardly or downwardly presented surface of said panel mount.

In yet a further aspect the present invention may be broadly said to consist in a panel mount for non penetrative fastening of a panel, said panel mount comprising:

a pair of clamp jaws having substantially opposed inner faces and defining an elongate slot in which an edge of a panel can be received, the elongate slot having an elongate direction, at least one fastener for mounting the panel mount to a side of a structure such that at least a portion of said panel, once fastened, extends above a top surface of said structure, two intermediate clamping members, one located adjacent each clamp jaw and to be positioned between each clamp jaw and the panel such that a panel can be clamped between the intermediate clamping members to secure the panel at the slot, each intermediate clamping member having at least one threaded member associated therewith, the at least one threaded member(s) facilitating adjustment of the intermediate clamping member to which the at least one threaded member is associated relative to each intermediate clamping member's adjacent clamping jaw, and independently of the other intermediate clamping member, wherein the slot has a general plane which extends along the elongate direction of the slot and is substantially co-planar with the inner faces of the slot, and at least one of said at least one threaded members is oriented such that its elongate axis lies non-perpendicular to the general plane of the slot.

In respect of the three aspects of the invention described above, the following apply:

In some embodiments one of the intermediate clamping members is adjustable by movement of at least one threaded member in a direction parallel to the elongate direction of the slot, the other intermediate clamping member being adjustable by at least one threaded member orientated substantially normal to the plane of the slot.

In some embodiments two threaded members are associated with one of, or each of, the intermediate clamping members.

In some embodiments the position of each end of intermediate clamping member is individually controllable.

In some embodiments one or more threaded member(s) cooperate with one or more of the intermediate clamping members to establish a wedging effect to cause movement of the intermediate clamping member.

In some embodiments the wedging effect can allow for rotation and/or displacement of the intermediate clamping member.

In some embodiments the wedging effect is established at one end of the intermediate clamping member.

In some embodiments the wedging effect is established at both ends of the intermediate clamping member.

In some embodiments the wedging effect is established at both ends of the intermediate clamping member and is facilitated by an associated threaded member located at or proximate each end of the clamping member.

In some embodiments one or more threaded member(s) bear (directly or indirectly) on angled surface(s) of at least one of said intermediate clamping members to adjust its position (displacement and/or rotational position).

In some embodiments the tip(s) of the threaded member(s) are angled to be complementary with the angled surfaces of the intermediate clamping member.

In some embodiments the angled tip(s) of the threaded member(s) cooperate(s) with the angled surfaces of the intermediate clamping member in a wedging manner to enable lateral adjustment of the intermediate clamping member.

In some embodiments the tip(s) are cone shaped.

In some embodiments the mounting means includes at least one fastener to fasten the panel mount to the side of the structure.

In some embodiments two fasteners are provided to fasten the panel mount to the side of the structure.

In some embodiments at least one fastener is oriented in a direction substantially normal to the plane of the panel to be held by the panel mount.

In some embodiments at least one fastener is a threaded fastener that can be screwed into the side of the structure.

In some embodiments at least one fastener is a lag screw.

In some embodiments the structure is a deck structure.

In some embodiments the panel mount further comprises spacing members to be positioned between the side of the structure and the panel mount, when mounted, to position panel mount at a distance away from the side of the structure.

In some embodiments the panel acts as a fence, balustrade or the like at the edge of the structure.

In some embodiments the panel is a glass pane.

In some embodiments the panel mount is positioned at least partially below an edge of the structure such that it is at least partially obscured from view when a person views the edge of the structure from a location on the top surface of the structure.

In some embodiments the slot is wider than the thickness of the panel.

In some embodiments the panel mount can operatively clamp said panel to hold it in said slot irrespective of any non-parallel disposition of the plane of said panel to the elongate direction of said slot.

Also herein described is a partition comprising at least one panel supported by at least one panel mount as described above.

In some embodiments the panel is supported by two panel mounts as described above.

In some embodiments the panel is supported by a plurality of panel mounts, each located at a discrete location along the edge of the panel.

Also herein described is a panel mount as herein described and as shown with reference to the accompanying drawings.

Also herein described is a partition as herein described and as shown with reference to the accompanying drawings.

Also herein described is a panel mount for mounting a panel adjacent to the edge of a structure, said panel mount comprising:

clamp jaws defining an elongate slot in which an edge of a panel can be received, mounting means to mount the panel mount at (and preferably to) the side of the structure such that the top of the panel mount is positioned in line, or beneath the edge of the structure to present the panel substantially above the edge of the structure.

Preferably the panel acts as a fence, balustrade or the like at the edge of the structure.

Preferably the panel is a glass pane.

Preferably the panel mount is positioned beneath the edge of the structure such that it is at least partially obscured from view when a person views the edge of the structure from a location on the structure.

Preferably the mounting means includes at least one fastener to fasten the panel mount to the side of the structure.

Preferably two fasteners are provided to fasten the panel mount to the side of the structure.

Preferably each fastener is oriented in a direction substantially normal to the plane of the panel held or to be held by the panel mount.

Preferably each fastener is a threaded fastener that can be screwed into the side of the structure.

Preferably each fastener is a lag screw.

Preferably a third fastener is provided to cooperate with a feature extending from the structure to provide further rigidity to the panel mount.

Preferably the third fastener is a headed fastener which cooperates with a feature that extends from the structure.

Preferably the third fastener is adjustable such that it can be adjusted so that its head abuts the feature that extends from the structure.

Preferably the abutment of the third fastener and the feature that extends from the structure increases the rigidity of the engagement between the panel mount and the structure.

Preferably the feature which extends from the structure is a lag screw.

Preferably the structure comprises a deck.

Preferably the panel mount is located below the decking surface of the deck.

Preferably spacing members are provided between the panel mount and the side of the structure so that the panel mount is positioned at a distance away from the side of the structure.

Preferably the panel is mounted to the panel mount in non-penetrative manner.

Preferably the panel is clamped between two intermediate clamping members held by the clamp jaws.

Preferably at least one and preferably both intermediate clamping members can be adjusted relative to the clamping jaws to adjust the orientation of the panel.

Preferably the orientation that can be adjusted is at least one of a rotational and translational orientation.

Preferably threaded members are provided to adjust the position of the intermediate clamping members in order to adjust the orientation of the panel.

Preferably each clamp jaw carries a pair of threaded members, the pair of threaded members of each clamp jaw being able to adjust the position of a corresponding intermediate clamping member.

Preferably at least one of the intermediate clamping members is adjustable by threaded member caused actuation operating in a direction parallel to the plane of the panel.

Preferably said threaded member caused actuation is achieved by at least one threaded member that is orientated to move in a direction non perpendicular to said panel plane and preferably parallel to said panel plane.

Preferably the at least one threaded member orientated in a direction non perpendicular to said panel plane can be adjusted from above or below the panel mount.

Preferably two threaded members are associated with the, or each, intermediate clamping member.

Preferably the threaded member(s) bear (directly or indirectly) on angled surface(s) of the intermediate clamping member to adjust its position (displacement and/or rotational position).

Preferably the tip(s) of the threaded member(s) are angled to be complementary with the angled surfaces of the intermediate clamping member.

Preferably the angled tip(s) of the threaded member(s) cooperate(s) with the angled surfaces of the intermediate clamping member in a wedging manner to enable lateral adjustment of the intermediate clamping member.

Preferably the tip(s) are cone shaped.

Preferably the threaded member(s) cooperate with the intermediate clamping member to establish a wedging effect to cause movement of the intermediate clamping member.

Preferably the wedging effect is established at both ends of the intermediate clamping member.

Preferably the wedging effect is established at both ends of the intermediate clamping member is facilitated by an associated threaded member located at each end of the panel clamp.

Preferably the wedging effect is established at one end of the intermediate clamping member.

Preferably the wedging effect can allow for rotation and/or displacement of the intermediate clamping member.

Preferably the position of each end of intermediate clamping member is individually controllable.

Preferably one of the intermediate clamping members is adjustable by threaded member caused actuation operating in a direction parallel to the plane of the panel, the other intermediate clamping member being adjustable by at least one threaded member orientated substantially normal to the plane of the panel.

Preferably both intermediate clamping members are adjustable by threaded member caused actuation operating in direction parallel to the plane of the panel.

Preferably the panel is or is to be clamped in a non-penetrative manner.

Preferably the threaded members are accessible and can be adjusted even when the panel mount is in situ.

Preferably the threaded members are grub screws.

Preferably a protective cover is provided to shroud or otherwise cover the panel mount.

Preferably the protective cover may extend to cover a plurality of panel mounts positioned along the structure.

Preferably the protective cover is orientated parallel to the edge of the structure.

Preferably the protective cover obscures from general view the panel mount(s).

Preferably the position of the protective cover is adjustable with respect to the panel mount to which it is engaged.

Preferably the panel mount includes a screw which can support the protective cover when it is placed over the panel mount, the screw being adjustable such that the height of the protective cover can be adjusted.

Also herein described is a panel mount as herein before described and as shown with reference to the accompanying drawings.

In another aspect the present invention consists in a panel mount for non penetrative fastening of a panel (such as a glass pane), said panel mount comprising:

mounting means for mounting the panel mount to a structure, a pair of clamp jaws defining an elongate slot in which an edge of a panel can be received, an intermediate clamping member located adjacent each clamp jaw and to be positioned between each clamp jaw and the panel such that a panel can be clamped between the intermediate clamping members to secure it at the slot, each intermediate clamping member having at least one threaded member associated therewith, the threaded member(s) facilitating adjustment of the intermediate clamping member to which it is associated relative to its adjacent clamping jaw, wherein at least one of the intermediate clamping members is adjustable by threaded member caused actuation operating in a direction parallel to the plane of the panel.

Preferably said threaded member caused actuation is achieved by at least one threaded member that is orientated to move in a direction non perpendicular to said panel plane and preferably parallel to said panel plane.

Preferably the at least one threaded member orientated in a direction non perpendicular to said panel plane can be adjusted from above or below the panel mount.

Preferably two threaded members are associated with the, or each, intermediate clamping member.

Preferably the threaded member(s) bear (directly or indirectly) on angled surface(s) of the intermediate clamping member to adjust its position (displacement and/or rotational position).

Preferably the tip(s) of the threaded member(s) are angled to be complementary with the angled surfaces of the intermediate clamping member.

Preferably the angled tip(s) of the threaded member(s) cooperate(s) with the angled surfaces of the intermediate clamping member in a wedging manner to enable lateral adjustment of the intermediate clamping member.

Preferably the tip(s) are cone shaped.

Preferably the threaded member(s) cooperate with the intermediate clamping member to establish a wedging effect to cause movement of the intermediate clamping member.

Preferably the wedging effect is established at both ends of the intermediate clamping member.

Preferably the wedging effect is established at both ends of the intermediate clamping member is facilitated by an associated threaded member located at each end of the panel clamp.

Preferably the wedging effect is established at one end of the intermediate clamping member.

Preferably the wedging effect can allow for rotation and/or displacement of the intermediate clamping member.

Preferably the position of each end of intermediate clamping member is individually controllable.

Preferably one of the intermediate clamping members is adjustable by threaded member caused actuation operating in a direction parallel to the plane of the panel, the other intermediate clamping member being adjustable by at least one threaded member orientated substantially normal to the plane of the panel.

Preferably both intermediate clamping members are adjustable by threaded member caused actuation operating in direction parallel to the plane of the panel.

Preferably the mounting means includes at least one fastener to fasten the panel mount to the side of the structure Preferably two fasteners are provided to fasten the panel mount to the side of the structure.

Preferably each fastener is orientated in a direction substantially normal to the plane of the panel to be held by the panel mount.

Preferably each fastener is a threaded fastener that can be screwed into the side of the structure.

Preferably each fastener is a lag screw.

Preferably the structure is a deck structure.

Preferably spacing members are provided between the panel mount and the side of the structure so that the panel mount extends is positioned at a distance away from the side of the structure.

Preferably the panel acts as a fence, balustrade or the like at the edge of the structure.

Preferably the panel is a glass pane.

Preferably the panel mount is positioned beneath the edge of the structure such that it is at least partially obscured from view when a person views the edge of the structure from a location on the structure.

Preferably the slot is larger than the thickness of the panel.

Preferably the panel mount can operatively clamp said panel to hold it in said slot irrespective of any non-parallel disposition of the plane of said panel to the elongate direction of said slot.

In another aspect the present invention consist in a panel mount for mounting a panel adjacent to the edge of a platform, said panel mount comprising:

clamp jaws defining an elongate slot in which an edge of a panel can be received, mounting means to mount the panel mount at (and preferably to) the side of the platform such that the top of the panel mount is positioned in line, or beneath the level of the platform to present the panel substantially above the edge of the level of the platform.

Also herein described is a partition comprising at least one panel supported by at least one panel mount as herein above described.

Preferably the panel is supported by two panel mounts as herein above described.

Preferably a plurality of panel mounts are used in an array to support at least one panel at discrete locations on said panel.

Preferably each panel is supported by a plurality of panel mounts, each located at a discrete locations along the edge of the panel.

Preferably the panel is supported in a non-penetrative manner.

Also herein described is a panel mount as herein before described and as shown with reference to the accompanying drawings.

Also herein described is a panel mount for mounting a panel (such as a glass pane), said panel mount comprising:

clamp jaws defining an elongate slot in which an edge of a panel can be received, a foot member located relative said clamping jaws and preferably within the slot and positioned to support the edge of a panel when it is received in the slot, wherein the foot member can be adjusted in the vertical direction by a user to adjust the vertical position of the panel relative to the clamping jaws.

Preferably the foot member is positioned substantially centrally of the slot.

Preferably the foot member is coupled to a screw which is threadingly engaged relative the clamping jaws.

Preferably the screw can be adjusted to adjust the vertical position of the foot member.

Preferably the screw is a grub screw.

Also herein described is a panel mount as herein before described and as shown with reference to the accompanying drawings.

Also herein described is a partition system comprising a plurality of panels to each be erected in a vertically extending manner and in edge to edge proximity to define a row of panels, a clamp located at the contiguous edges of two panels that are in edge to edge proximity and that is clampingly engaged onto said panels in a manner not requiring penetration of said panels, wherein the clamp urges the two adjacent panels to which it is engaged to an orientation that is substantially co-planar.

Preferably the clamp is positioned substantially toward the bottom of the adjacent panels.

Preferably the clamp may facilitate at least some degree of load transfer between the adjacent panels.

Preferably each panel is primarily supported by a panel mount.

Preferably the panel mount engages the clamp in a non-penetrative manner.

Preferably the clamp comprises:

a first plate, a second plate spaced apart but parallel to the first plate, and fastening means for fastening the plates together, to cause each said panel to be releasably clamped between the first and second plates.

Preferably said fastening means can simultaneously cause each said panel to be releasably clamped between the plates.

Preferably said fastening means is located substantially centrally of the first and second plates and extends between the plates through the gap between the adjacent panels.

Preferably said fastening means comprises a threaded arrangement.

Preferably said fastening means comprises a bolt and nut.

Preferably the first and second plates have plastic layers on their sides which contact the panels.

Preferably said clamp can transfer vertical load of or acting on one panel to the adjacent panel.

Preferably at least one panel of the two adjacent panels is supported by a panel clamp as herein before described.

Preferably at least one panel of the two adjacent panels is supported by two panel clamps as herein before described.

Preferably both adjacent panels are so supported.

Preferably only one adjacent panel is so supported.

Preferably the partition includes three adjacent panels, wherein the outer panels are each supported by at least one panel as herein before described and the inner panel is not so supported.

Preferably the inner panel is supported only by the support provided by its clamping to the adjacent panels.

Preferably a protective cover is provided to shroud or otherwise cover the panel mounts of the partition system.

Preferably the protective cover is orientated parallel to the edge of a structure to which the panel mounts are affixed.

Preferably the protective cover obscures from general view the panel mounts.

Preferably the position of the protective cover is adjustable with respect to the panel mounts to which it is engaged.

Preferably the panel mounts includes a screw which can support the protective cover when it is placed over the panel mount, the screw being adjustable such that the height of the protective cover can be adjusted.

Preferably the height of the screws of each panel mount in the partition system can be adjusted to compensate for any misalignment in the height of the panel mounts such that the protective cover is level.

Also herein described is a panel mount for non penetrative fastening of a panel (such as a glass pane), said panel mount comprising:

mounting means for mounting the panel mount to a structure, a pair of clamp jaws defining an elongate slot in which an edge of a panel can be received, an intermediate clamping member located at least partially within a recess of each clamp jaw and to be positioned between each clamp jaw and the panel such that a panel can be clamped between the intermediate clamping members to secure it at the slot, wherein at least one of the intermediate clamping members is adjustable by threaded member caused actuation operating in a direction parallel to the plane of the panel, and wherein registration means restricts movement of the said intermediate clamping member in a direction parallel to the plane of the panel.

Preferably the registration means includes a registration surface located in the recess that interacts with a complementary registration surface on the intermediate clamping member.

Preferably the complementary registration surface defines a plane that is perpendicular to the plane of the panel.

Preferably the complementary registration surface on the intermediate clamping member is a flat top surface.

Preferably the interaction between the registration surface and the complementary registration surface prevents the intermediate clamping member from dislodging from the recess.

Preferably the intermediate clamping member includes an angled region adjacent to the complementary registration surface, the angled region being the surface to which the threaded member engages to adjust the position of the intermediate clamping member.

Preferably the angled region is central of the complementary registration surface.

Preferably both intermediate clamping members are adjustable by threaded member actuation operating in a direction parallel to the plane of the panel.

Preferably both intermediate clamping members are restricted from moving in a direction parallel to the plane of the panel due to registration means.

Also herein described is a panel mount for non penetrative fastening of a panel (such as a glass pane), said panel mount comprising:

mounting means for mounting the panel mount to a structure, a pair of clamp jaws defining an elongate slot in which an edge of a panel can be received, wherein at least one of the clamp jaws includes three threaded members which are positioned to act on, either directly or indirectly, the panel to hold it in the slot.

Preferably one of the three threaded members is a positioning member used to establish an initial position of the panel in the slot prior to fastening the other two threaded members.

Preferably the positioning member of one of the clamp jaws is vertically located intermediate and preferably in line with respect to the other two threaded members in the jaw.

Preferably the positioning member of both of the clamp jaws is vertically located intermediate and preferably in line with respect to the other two threaded members in the jaw.

Preferably each clamp jaw includes three threaded members, wherein one of the three threaded member is a positioning member.

Preferably the axes of the three threaded members of each clamp jaw extends through the panel Preferably each threaded member in one of the clamp jaws is coaxial with a corresponding threaded member in the other clamp jaw.

Preferably the positioning members in each jaw are substantially aligned with one another.

Preferably the positioning members in each jaw are not aligned with one another.

Preferably the positioning members in each jaw are coaxial.

Preferably the positioning members in each jaw engage, either directly or indirectly, the panel to establish a pivot for the panel.

Preferably the positioning members in each jaw establishes a pivot for purposes to allow the panel to be properly aligned before the other two threaded members in each jaw are fastened.

Preferably the three threaded members indirectly engage the panel via an intermediate clamping member.

Preferably the intermediate clamping member engages the panel and the three threaded members engage the intermediate clamping member.

Preferably the three threaded members held by each jaw are aligned vertically with respect to one another in the jaw.

Preferably the positioning member in each clamp jaw is orientated substantially perpendicular to the plane of the panel and the other two threaded members are orientated substantially parallel with the panel.

Also herein described is a panel mount for non penetrative fastening of a panel (such as a glass pane), said panel mount comprising:

mounting means for mounting the panel mount to a structure, a pair of clamp jaws defining an elongate slot in which an edge of a panel can be received, wherein at least one of the clamp jaws includes three threaded members which are positioned to be fastenable to engage, either directly or indirectly, the panel to hold it in the slot, and wherein one of the three threaded members is a positioning member used to define a pivot for the panel prior to fastening the other two threaded members.

Preferably the positioning member is located centrally with respect to the other two threaded members in the jaw.

Preferably each clamp jaw includes three threaded members, wherein one of the three threaded member is a positioning member.

Preferably the positioning members in each jaw are substantially aligned with one another.

Preferably the positioning members in each jaw are coaxial.

Preferably the positioning members in each jaw engage, either directly or indirectly, the panel to establish a pivot for the panel.

Preferably the positioning members in each jaw establishes a pivot for purposes to allow the panel to be properly aligned before the other two threaded members in each jaw are fastened.

Preferably the three threaded members indirectly engage the panel via an intermediate clamping member.

Preferably the intermediate clamping member engages the panel and the three threaded members engage the intermediate clamping member.

Preferably the three threaded members held by each jaw are aligned vertically with respect to one another in the jaw.

Preferably the positioning member in each clamp jaw is orientated substantially perpendicular to the plane of the panel and the other two threaded members are orientated substantially parallel with the panel.

Also herein described is a method of mounting a panel to a panel mount as herein described, the method comprising the steps of:

placing the panel into the slot of the panel mount, finger tightening the two opposed positioning members to establish a pivot point for the panel, adjusting the height of the panel relative to panel mount to a desired height, adjusting the second and third threaded members of the first of the two clamp jaws to ensure the panel is in a desired orientation, adjusting the second and third threaded members of the second of the two clamp jaws, tightening all of the threaded members to hold the panel rigidly in the desired position.

Preferably the height of the panel can be adjusted via an adjustable foot located substantially centrally of the slot.

Preferably the adjustable foot is threadingly engaged with the panel mount.

Also herein described is a method of erecting a partition comprising of a plurality of panels, each supported by at least one panel mount as herein described, the method comprising the steps of:

placing each panel of the partition in a slot of its associated panel mount, finger tightening the two opposed positioning members of each panel mount to establish a pivot for the panel in each panel mount, adjusting the height of each panel relative to the other panels in the partition to ensure their heights are at least substantially aligned with one another, adjusting the second and third threaded members of the first of the two clamp jaws of each panel mount to ensure each panel is in a desired orientation relative to one another, adjusting the second and third threaded members of the second of the two clamp jaws of each panel mount, tightening all of the threaded members to hold each panel rigidly in the desired position.

Preferably a alignment means is used to ensure correct alignment of all of the panels in the partition prior to securing the panels to the panel mounts.

Preferably the alignment means is a plumb line.

Preferably adjacent panels can be subsequently connected via a clamp to promote alignment between the adjacent panels.

Preferably the clamp clamps the panels in a non-penetrative manner.

Also herein described is a partition system as herein before described and as shown with reference to the accompanying drawings.

Other aspects of the invention may become apparent from the following description which is given by way of example only and with reference to the accompanying drawings.

As used herein the term "and/or" means "and" or "or", or both.

As used herein "(s)" following a noun means the plural and/or singular forms of the noun.

The term "comprising" as used in this specification means "consisting at least in part of". When interpreting statements in this specification which include that term, the features, prefaced by that term in each statement, all need to be present but other features can also be present. Related terms such as "comprise" and "comprised" are to be interpreted in the same manner.

The entire disclosures of all applications, patents and publications, cited above and below, if any, are hereby incorporated by reference.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

The invention will now be described by way of example only and with reference to the drawings in which:

FIG. 1 shows a side on view of a panel supported by a panel mount of the present invention, the panel mount being secured to the side of a structure, FIG. 2 shows a cross section view of a preferred embodiment of a panel mount assembly of the present invention, FIG. 3 shows an oblique view of a preferred embodiment of a panel mount of the present invention, FIG. 4 shows an end view of the panel mount of FIG. 3, FIG. 5A shows a side view of the panel mount of FIG. 3 with the panel in a first position, FIG. 5B shows a side view of the panel mount of FIG. 3 with the panel in a second position, FIG. 6 shows a partition arrangement of the present invention, FIG. 7 shows an exploded view of the clamp assembly of FIG. 6, FIG. 8 shows a side view of an intermediate clamping member, FIG. 9 shows a isometric view of an intermediate clamping member, FIG. 10 shows a front view of an intermediate clamping member, FIG. 11 shows an end view of an intermediate clamping member, FIG. 12 shows a cross sectional side view of a panel mount with an intermediate clamping member as shown in FIGS. 8 to 12 located in one of the jaws, FIG. 13 shows an isometric view of a preferred embodiment of a panel mount of the present invention with three apertures located in one of the jaws for engaging threaded members, FIG. 14 shows a side view of the panel mount of FIG. 13, FIG. 15 shows an end view of the panel mount of FIG. 13, FIG. 16 shows a cross section side view of the panel mount of FIG. 13, FIG. 17 shows a possible configuration of threaded members in a panel mount of the present invention, FIG. 18 shows an alternative possible configuration of threaded members in a panel mount of the present invention, FIG. 19 shows a side view of a preferred embodiment of a panel mount of the present invention, FIG. 20 shows the other side of the panel mount of FIG. 19, FIG. 21 shows the end view of the panel mount of FIG. 19, FIG. 22 shows a perspective view of the panel mount of FIG. 19, FIG. 23 shows a side view of the panel mount of FIG. 19 with a cover located thereon, and FIG. 24 shows a side view of a panel mount engaged with a structure, and shows the abutment of a headed fastener engaged with the panel mount and a fastener engaged with the structure.

DETAILED DESCRIPTION OF THE INVENTION

With reference to FIG. 1 there is shown a panel mount 1 for mounting a panel 2. The panel 2 is received in the slot 3 which is defined by first and second clamp jaws 4 and 5 respectively. The panel 2 is preferably a glass pane, but may be any other type of panel made from any material.

The panel mount 1 is shown mounted to the side of a structure 6 such that the top extent of the panel mount 1 does not extend beyond the top edge 7 of the structure 6. In some applications it may be desirable for the panel mount 1 to be located in such a manner so that it is at least partially obscured from view for a person located on the structure. The lower the panel mount 1 is below the edge 7, the more it will be obscured from view for a person located on the structure. When the panel mount is located below the edge 7, the panel 1 can extend above the edge and, if the panel is glass, a person located on the structure will have an unobscured view through the glass. This may be particularly desirable for applications such as partitions or balustrades on the edge of deck structures. In such applications, the panel mount 1 may be fastened to a timber joist 8 at the side of the structure, and be positioned at or below the level of timber decking 9. It should be appreciated that panel mount of the present invention is also suited to many other applications.

FIG. 2 shows a cross section view of the panel mount of the present invention. Fasteners 10 and 11 are used to fasten the panel mount 1 to the structure 6. As shown on FIGS. 3 and 4, a channel 12 may provide access to fastener 10 to allow tightening and loosening of fastener 10. Because of the geometry of the panel mount, fastener 11 may not be able to be tightened directly. Instead, the fastener 11 may be fastened into the structure 6 first, and then the panel mount 1 may be "wound" onto fastener 11. Once the panel mount 1 has been wound onto the fastener 11, the fastener 10 can be used to complete the fastening of the panel mount 1 to the structure 6. Preferably the fasteners 10 and 11 are lag screws.

Spacing members 13 may be located between the panel mount 1 and the structure 6 so that the panel mount 1 can be positioned at a distance away from the structure. The spacing members may be cylindrical in shape and have an internal bore to allow passage of the fasteners 10 and 11.

In addition to the fasteners 10 and 11, there may be provided a fastener 83 as shown in FIG. 24. Preferably the fastener 83 is also a lag screw. The fastener 83 can cooperate with the headed fastener 84 which is threadingly engaged with the jaw 5 of the panel mount 1. When the panel mount 1 is in the desired position, the headed fastener 84 may be adjusted so that the head abuts the end of the fastener 83. The arrangement shown in FIG. 24 may provide extra rigidity to the system. The abutment of fastener 83 and headed fastener 84 reduces any "play" in the engagement between the panel mount and the structure 6.

It should be appreciated that the aforementioned method of mounting the panel mount 1 to the structure 6 is only one possible method. Other methods as would be apparent to a person skilled in the art may be employed.

In a preferred embodiment the panel mount 1 includes two intermediate clamping members 14 and 15. Intermediate clamping member 14 is held by jaw 4 and intermediate clamping member 15 is held by jaw 5.

The clamping members can cooperate to clamp a panel 2 in between them. Plastic members 16 and 17 may be located on the inwardly facing surfaces of clamping members 14 and 15. The plastic members 16 and 17 engage the panel 2 when the intermediate clamping members 14 and 15 are brought closer together to clamp the panel 2 and may reduce the risk of scratching or otherwise damaging the panel 2.

Adjustment of the intermediate clamping member 14 is facilitated by threaded members 18 and 19 which are threadingly engaged with the jaw 4 and are preferably orientated substantially normal to the plane of the panel 2. In the preferred embodiment of the invention, the threaded members are grub screws that can be adjusted by a user to adjust the position of the intermediate clamping member 14. As threaded member 18 is located towards the top of the intermediate clamping member and threaded member 19 is located towards the bottom of the intermediate clamping member, adjustment of the intermediate clamping member 14 through a range of angular positions is possible. The intermediate clamping member 14 can be adjusted to an angle relative to the general plane of the slot 3 if such is necessary in order to orientate the panel 2 in the desired manner.

Adjustment of intermediate clamping member 15 is facilitated by threaded members 20 and 21 which are threadingly engaged with the jaw 5 in an orientation substantially parallel to the plane of the panel 2. Because of this vertical orientation, the threaded members 20 and 21 can be accessed from above and below the panel clamp 1. This may be particularly important in applications where the panel mount 1 is side mounted to a structure 6 (i.e. as shown in FIG. 2) and access to horizontally orientated threaded members (such as 18 and 19) would be difficult.

In the preferred embodiment of the invention, the threaded members 20 and 21 are grub screws with cone shaped tips. The cone shaped tips can engage an angled region 22 of the intermediate clamping member 15, such angled regions 22 preferably being presented for engagement with the cone shaped tip at the upper and lower ends of the clamping member when held in the jaw. In such a configuration, adjustment of the threaded members 20 and 21 in the vertical direction will cause adjustment of the intermediate clamping member 15 in the lateral direction. By rotating the grub screw 21 it may also be possible to make small adjustments in the vertical direction. The interaction between the cone shaped tips of the threaded members and the angled region 22 enables the adjustment of the intermediate clamping member 15 in a "wedging" manner.

As threaded member 20 is located towards the top of the intermediate clamping member 15 and threaded member 21 is located towards the bottom of the intermediate clamping member 15, full adjustment of the position of the intermediate clamping member 15 is possible. The intermediate clamping member 15 can be adjusted to an angle relative to the general plane of the slot 3 if such is necessary in order to orientate the panel 2 in the desired manner. Because the position of each end of the clamping member 15 can be adjusted independently a range of angular positions of the clamping member 15 can be achieved.

In the preferred embodiment of the invention the panel clamp 1 has an adjustable foot member 25. The foot member 25 is located centrally of the slot 3 and is positioned to support the edge of the panel 2 received in the slot 3. The foot member 25 is coupled to a screw 26 which is threadingly engaged with the body of the panel mount 1. The screw 26 is preferably a grub screw, however it may alternatively be a headed screw. The screw 26 extends into the channel 12, so that a user can adjust it to adjust the vertical position of the foot member 25 and thus the panel 2 supported by the foot member 25.

FIG. 5A shows a panel mount 1 with the foot member 25 supporting the panel 2. In FIG. 5A, the screw 26 is adjusted so that the foot member 25 is positioned at its lowest vertical extent. FIG. 5B shows the same panel mount 1 however the vertical position of the foot member 25 has been adjusted to a higher position. Adjustment of the screw 26 allows for adjustment of the height of the foot member 25 and thus adjustment of the vertical position of the panel 26.

A partition comprising two or more panel mounts 1 and two or more panels 2 may be constructed. Such a partition is shown with reference to FIG. 6 in which the panel mounts 1 are shown to be secured to the structure 6 at positions such that they do not extend beyond the edge 7 of the panel. The partition shown in FIG. 6 may, for example, be a balustrade on the edge of a deck structure 6. In such an installation, the individual panel mounts 1 would be first secured to the structure 6. Securement of the panel mounts 1 may be in a way as described above, i.e. through the use of fasteners 10 and 11. Once the panel mounts 1 are secured to the structure 6, the panels 2 may be received in the slot 3 of the panel mounts 1. The vertical position and level of the panels 2 relative to one another and relative to the structure itself can then be assessed. If adjustment to the vertical position of the panels is necessary, then a user can adjust the screw 26 to cause adjustment of the foot member 25. When the vertical position of the panels 2 is acceptable, a user can then ensure they are properly secured to the panel clamps 1. Adjustment of the intermediate clamping members 14 and 15 (via threaded members 18, 19 and 20, 21 respectively) can be made by a user to ensure secure clamping of the panels 2 by the intermediate clamping members regardless of minor misalignments between the partition components and any irregularities in the planarity of the panel.

As shown in FIG. 6, a clamp 30 may be provided to clamp the two edges of the panels 2 together. The clamp 30 may comprise a first plate 31 and a second plate 32 as shown in FIG. 7. The first and second plates 31 and 32 may be held together by fastening means located centrally of the two plates. Central location of the fastening means allows for the clamp 30 to engage the two adjacent panels in a non-penetrative manner. In situ, one plate is located either side of the panels 2 and the fastening means extends between the two parallel plates in the gap between the two panels 2. In the preferred embodiment the fastening means is a threaded arrangement such as a nut 33 and bolt 34 arrangement as shown in FIG. 7.

Clamping the two panels together via a clamp 30 as shown in FIG. 6 can provide a number of advantages to the partition system.

Firstly, it may facilitate some degree of load transfer between the panels. For instance, if a load is exerted on one panel, some of the load may be transferred through the clamp 30 and into the other panel. Better distribution of load can reduce the risk of failure of the panels 2 or the panel mounts 1 in a partition system.

Secondly, the clamp 30 may help ensure that the adjacent panels 2 remain in a substantially co-planar relationship to one another. Aligning the two panels via the clamp 30 near the base of the panels helps ensure the two panels are aligned along their entire height.

In the preferred embodiment of the invention the first and second plates have plastic layers on the sides which contact the panels to reduce the risk of scratching or otherwise damaging the panels.

Optionally a protective cover 35 is provided to shroud or otherwise cover the one or more of the row of panel mounts 1. The protective cover 35 may cover the panel mounts so that they are not exposed to the weather, and so that they are obscured from view. In the preferred embodiment the protective cover 35 extends along the structure parallel to its upper edge, and preferably substantially parallel to the face of the structure upon which the mounts are affixed.

As shown in FIG. 23, the protective cover 35 can cover the external side and bottom of the panel mount 1. The cover 35 may have an arm 80 that attaches to or clips over the top of the jaw 4 to hold the cover 35 to the jaw 4.

The height of the cover 35 can be set via screw 81 before the cover 35 is placed on the arm 4. Fastener 82 can be adjusted to ensure the cover 35 is tightly located on the jaw 4.

The cover is preferably long enough to cover multiple panel mounts located along the side of a structure. Preferably the cover 25 is extruded, so can be of any length as desired. In use, the panel mounts 1 located along the side of a structure 6 may not be perfectly aligned with regards to height. Therefore, the screw 81 on each panel mount 1 can be adjusted accordingly, so that the cover 35 is level. In this way, adjustment of screw 81 can compensate for misaligned panel mounts 1 along the side of a structure.

The panel mount 1 may utilize an intermediate clamping member 40 as shown in FIGS. 8-12. The clamping member 40 is preferably received into a recess or channel in the jaw 4 or 5 respectively which retains the member in an approximate position, but allows a significant degree of movement of the member within the recess. However, preferably, the recess does not permit angular or horizontal movement of the clamping member 15 in the plane of the slot.

The intermediate clamping member 40 is provided with a flat top end region 41 but also has a central angled region 22 adjacent the flat top end region 41. The central angled region 22 allows for adjustment of the clamping member 40 via a threaded member 20 positioned in an orientation substantially parallel to the panel.

The flat top end region 41 is able to register with a complementary registration surface 42 on the clamp jaw as shown in FIG. 12. While being adjusted via the bottom threaded fastener 21, the intermediate clamping member tends to be forced upwards and if not for the flat top end 41, it may dislodge from the recess in the jaw 5. The interaction between the flat top end 41 and the registration surface 42 therefore restricts movement of the intermediate clamping member 40 in a direction parallel to the direction of the panel when it is being adjusted.

The intermediate clamping member 40 may be associated with one or both of the jaws 4 and 5. Preferably it is associated with the jaw 5 because the intermediate clamping member of the jaw 5 is adjusted via vertically orientated threaded members which tend to cause dislodgement of the intermediate clamping member 40 from the recess. The intermediate clamping member 40 may be slidingly or otherwise associated, or there may be geometric features of shape of the recess that retain the clamping member 40 in association with the jaw.

An alternative panel mount 1 is shown with respect to FIGS. 13 to 16. The jaw 4 of the panel clamp 1 includes three apertures for three threaded members to act on the intermediate clamping member 43. The apertures 50 and 51 are vertically spaced apart and aperture 52 is positioned centrally of apertures 50 and 51.

The jaw 5 also includes three apertures for three threaded members to act on the intermediate clamping member 40. The apertures 53 and 54 are positioned substantially parallel to the plane of the panel. The threaded members received by apertures 53 and 54 interact in a "wedging" manner with the intermediate clamping member 40. They are positioned so that they can be easily accessed from above and below the panel mount, even when the panel mount is fixed to a structure. Aperture 55 is also provided and is able to receive a threaded member. Preferably the threaded member is a headed bolt, so that it can be adjusted easily even when the panel mount is fixed to a structure. The aperture 55 and the aperture 52 are substantially aligned.

The threaded members associated with aperture 52 and 55 are preferably positioning members in that they are used to position the panel at the desired location within the slot, for example by setting the distance between the face of the panel and the inner face of the slot. In use, the positioning members are tightened before tightening of any of the other threaded members. Once the panel is in the desired position, the threaded members associated with apertures 50, 51, 53 and 54 are tightened. Once tightened, the threaded members associated with aperture 52 and 55 create a pivot point for the panel. The orientation (and in particular the angular orientation) of the panel with respect to the slot can then be adjusted as required before tightening the threaded members associated with apertures 50, 51, 53 and 54.

FIGS. 17 and 18 show two different possible configurations of a panel clamp 1. In one embodiment, the panel clamp 1 of FIGS. 17 and 18 has three threaded members held by each clamp jaw 4 and 5. The axes of the threaded members are perpendicular to the plane of the panel 2. In FIG. 17, the positioning members 60 and 61 are substantially coaxial with one another.

In FIG. 18 it can be seen that the positioning members are not coaxial with one another. It should be appreciated that the threaded member acting as a positioning members in one jaw does not need to be coaxial with the threaded member acting as the positioning member in the other jaw, and that in some embodiments non-coaxial positioning members will co-operate to position the panel The method of clamping a panel to the panel clamp 1 of FIGS. 13 to 16 is described below:

Firstly, an intermediate clamping member is associated with each jaw 4 and 5.

Secondly, a panel is positioned within the slot 3 between the jaws and the intermediate clamping members. Optionally the height of the panel can be adjusted via adjustment of the foot member 25.

Thirdly, the positioning members associated with apertures 52 and 55 are finger tightened. This forces the intermediate members 43 and 40 against the panel and establishes a pivot point about which the panel can pivot.

Fourthly, the panel is moved into a desired orientation. The establishment of a pivot point allows the orientation of the panel with respect to the slot to be altered.

Fifthly, and once the desired orientation of the panel is established, the threaded members associated with apertures 50, 51, 52 and 54 are tightened to firmly grip the panel between the intermediate clamping members.

Finally, the positioning members associated with apertures 52 and 55 are firmly tightened to secure the panel in a rigid, fixed position.

A partition may be created using a plurality of adjacent panels, each supported by at least one panel mount. When erecting a partition, each panel is clamped to the panel clamp using the method described above, however an alignment measure such as a plumb line may be used to ensure each panel in the partition is properly aligned.

A further alternative panel mount is shown in FIGS. 19 to 22. The jaw 4 of the panel clamp 1 includes three apertures for three threaded members to act on the intermediate clamping member 43. The apertures 70 and 71 are spaced apart and aperture 52 is positioned between them.

The threaded members that are received by apertures 70 and 71 move vertically interact in a "wedging" manner with the intermediate clamping member 43 to control its position. They are positioned so that they can be easily accessed from above and below the panel mount.

Similarly, the jaw 5 includes apertures 53 and 54 for receiving threaded fasteners which can be adjusted to control the position of the intermediate clamping member 40. In this embodiment of the invention, the arrangement of threaded fasteners for manipulating the position of the intermediate clamping member is the same in each jaw.

The threaded members associated with aperture 52 and 55 are positioning members and move in a direction normal to the plane of the slot. They are used to position the panel at the desired location within the slot, for example by setting the distance between the face of the panel and the inner face of the slot. In use, the positioning members are tightened before any of the other threaded members. Once the panel is in the desired position, the threaded members associated with apertures 70, 71, 53 and 54 are tightened. After a panel is placed in the slot, the threaded members associated with aperture 52 and 55 are tightened to create a pivot point for the panel. The orientation of the panel with respect to the slot can then be adjusted as required before tightening the threaded members associated with apertures 70, 71, 53 and 54.

Where in the foregoing description reference has been made to elements or integers having known equivalents, then such equivalents are included as if they were individually set forth.

Although the invention has been described by way of example and with reference to particular embodiments, it is to be understood that modifications and/or improvements may be made without departing from the scope or spirit of the invention.

I claim:

1. A panel mount for non penetrative fastening of a panel, said panel mount comprising:

at least one fastener for mounting the panel mount to a side of a structure such that at least a portion of said panel, once fastened, extends above a top surface of said structure, a pair of clamp jaws having substantially opposed inner faces and defining an elongate slot in which an edge of the panel can be received, the elongate slot having an elongate direction, between a mouth and a base of the slot, and a general plane which extends along the elongate direction of the slot and is substantially parallel to the inner faces of the jaws, two intermediate clamping members, one located adjacent each clamp jaw and to be positioned between each clamp jaw and the panel such that the panel can be clamped between the intermediate clamping members to secure the panel at the slot, each intermediate clamping member comprising a first end and a second end along the elongate direction, each intermediate clamping member having at least two threaded members associated therewith, the at least two threaded members being spaced apart in the elongate direction and facilitating independent adjustment of a lateral position between the clamp jaws of each of the first end and second end of the intermediate clamping member to which the threaded members are associated, wherein adjustment of the ends of the intermediate clamping member provides control of both a) the lateral position, relative to the clamp jaws, and
b) an angular orientation, about a transverse axis located perpendicular to the elongate direction and lying on the general plane of the slot, of the intermediate clamping member to which the threaded members are associated, wherein adjustment of the ends of one intermediate clamping member is independent of the other intermediate clamping member, and at least one end of at least one of the intermediate clamping members is adjustable so as to be positioned by movement of at least one respective threaded member in a direction parallel to the general plane of the slot.

2. The panel mount of claim 1 wherein said at least one threaded member that moves in the direction parallel to the general plane of the slot is oriented such that during movement an elongate axis of the at least one threaded member is in a direction parallel to the general plane of the slot.

3. The panel mount of claim 1 wherein said at least one threaded member moveable in the direction parallel to the general plane of the slot can be adjusted either from above or below the panel mount.

4. The panel mount of claim 1 wherein one of the first end or second end of each intermediate clamping member is adjustable by movement of at least one threaded member in the direction parallel to the general plane of the slot.

5. The panel mount of claim 1 wherein one of the first end or second end of one of the intermediate clamping members is adjustable by movement of at least one threaded member in the direction parallel to the general plane of the slot, and one of the first end or second end of the other intermediate clamping member is adjustable by at least one threaded member orientated substantially normal to the general plane of the slot.

6. The panel mount of claim 1 wherein said at least two threaded members each cooperate with a respective end of an associated intermediate clamping member to establish a wedging effect to cause the adjustment of the ends of the associated intermediate clamping member.

7. The panel mount of claim 1 wherein at least one of said at least two threaded members bear either directly or indirectly on an angled surface of an associated intermediate clamping member to provide the adjustment of the ends of the associated intermediate clamping member.

8. The panel mount of claim 7 wherein the at least two threaded members each have a tip, the tips each being angled to be complementary with angled surfaces of the intermediate clamping member.

9. The panel mount of claim 1 wherein said at least one fastener is oriented in a direction substantially normal to the general plane of the slot.

10. The panel mount of claim 1 wherein spacing members are to be positioned between the side of the structure and the panel mount, when mounted, to position the panel mount at a distance away from the side of the structure.

11. The panel mount of claim 1 wherein the slot is wider than a thickness of the panel.

12. The panel mount of claim 1 wherein the panel mount can operatively clamp said panel to hold the panel in said slot irrespective of any non-parallel disposition of a plane of said panel to the general plane of said slot.

13. The panel mount of claim 1 wherein the at least two threaded members comprise a primary threaded member and two secondary threaded members for each intermediate clamping member, each primary threaded member facilitating a lateral movement of each primary threaded member's associated intermediate clamping member relative the intermediate clamping member's respective clamp jaw, the primary threaded members each operable to force respective intermediate clamping members against a panel to be clamped between the intermediate clamping members, to establish a pivot point about which the panel can pivot, and wherein the secondary threaded members are configured to facilitate the adjustment of the orientation of the intermediate clamping members and the clamped panel about a respective primary threaded member formed pivot and, when tightened, securely hold a clamped panel between the intermediate clamping members.

* * * * *